US012636710B2

(12) United States Patent
Streck et al.

(10) Patent No.: US 12,636,710 B2
(45) Date of Patent: May 26, 2026

(54) MACHINE TOOL

(71) Applicant: Mazak Corporation, Florence, KY (US)

(72) Inventors: Donald Thomas Streck, Florence, KY (US); Lem Linder, Florence, KY (US)

(73) Assignee: Mazak Corporation, Florence, KY (US)

( * ) Notice: Subject to any disclaimer, the term of this patent is extended or adjusted under 35 U.S.C. 154(b) by 871 days.

(21) Appl. No.: 17/942,107

(22) Filed: Sep. 9, 2022

(65) Prior Publication Data

US 2024/0082927 A1 Mar. 14, 2024

(51) Int. Cl.
| | |
|---|---|
| *B23B 29/00* | (2006.01) |
| *B23B 29/24* | (2006.01) |
| *B23B 7/04* | (2006.01) |

(52) U.S. Cl.
CPC .............. B23B 29/244 (2013.01); *B23B 7/04* (2013.01)

(58) Field of Classification Search
None
See application file for complete search history.

(56) References Cited

U.S. PATENT DOCUMENTS

| | | | |
|---|---|---|---|
| 3,221,352 | A | 12/1965 | Pfister |
| 4,258,598 | A | 3/1981 | Hoffmann |
| 5,170,686 | A | 12/1992 | Schalles |
| 6,401,348 | B1 | 6/2002 | Cavanaugh |

| | | | |
|---|---|---|---|
| 6,637,306 | B2 | 10/2003 | Miyano |
| 7,260,877 | B2 | 8/2007 | Broadley |
| 7,464,628 | B2 | 12/2008 | Shinohara |
| 7,555,973 | B2 | 7/2009 | Asahara |
| 7,886,453 | B2 | 2/2011 | Ould |
| 8,244,396 | B2 | 8/2012 | Terai |
| 8,297,158 | B2 | 10/2012 | Watanabe |
| 9,592,556 | B2 | 3/2017 | Kotake |
| 9,616,500 | B2 | 4/2017 | Yanakawa |
| 10,052,144 | B2 | 8/2018 | Willert |
| 10,293,446 | B2 | 5/2019 | Jacot |

(Continued)

FOREIGN PATENT DOCUMENTS

| | | |
|---|---|---|
| CN | 202180213 | 4/2012 |
| DE | 2245994 A1 | 4/1973 |

(Continued)

OTHER PUBLICATIONS

Decision to Grant a Patent, issued in Japanese Application No. 2022-552969, dated May 30, 2023, 5 pages.

(Continued)

*Primary Examiner* — Paul B Yanchus, III

(74) *Attorney, Agent, or Firm* — Fitch, Even, Tabin & Flannery LLP

(57) ABSTRACT

In one aspect, a method of preparing a machine tool to machine a workpiece. The machine tool includes an artifact in the machine tool and a probe mounted to a head of the machine tool. The method includes determining a tool offset value for a tool by moving the probe and the tool relative to one another to bring the probe and the tool into contact with one another. Prior to determining the tool offset value, the method includes calibrating the probe by moving the probe and the artifact relative to one another to bring the probe and the artifact into contact with one another.

38 Claims, 21 Drawing Sheets

(56) References Cited

U.S. PATENT DOCUMENTS

| | | | |
|---|---|---|---|
| 10,507,528 | B2 | 12/2019 | Jacot |
| 11,833,630 | B2 | 12/2023 | Hattori |
| 2003/0024358 | A1 | 2/2003 | Chang |
| 2004/0244464 | A1* | 12/2004 | Hajdukiewicz ...... G01B 21/042 |
| | | | 73/1.79 |
| 2007/0199415 | A1 | 8/2007 | Ando |
| 2007/0227317 | A1 | 10/2007 | Asahara |
| 2015/0292854 | A1 | 10/2015 | Gagnon |
| 2017/0045357 | A1* | 2/2017 | Lummes .............. G05B 19/401 |
| 2019/0375066 | A1 | 12/2019 | Suzuki |
| 2022/0379416 | A1 | 12/2022 | Hattori |
| 2023/0408986 | A1* | 12/2023 | Ozeki ................ G05B 13/0245 |
| 2024/0082925 | A1 | 3/2024 | Hattori |
| 2024/0165755 | A1 | 5/2024 | Hattori |

FOREIGN PATENT DOCUMENTS

| | | | |
|---|---|---|---|
| DE | 3442866 | A1 | 5/1986 |
| DE | 102011120765 | A1 | 6/2013 |
| EP | 1177846 | B1 | 5/2007 |
| EP | 1829637 | B1 | 7/2015 |
| JP | S55169303 | U | 12/1980 |
| JP | S58123414 | A | 7/1983 |
| JP | H06254747 | A | 9/1994 |
| JP | H0825183 | A | 1/1996 |
| JP | H09225703 | A | 9/1997 |
| JP | H09300177 | A | 11/1997 |
| JP | H11070440 | A | 3/1999 |
| JP | 2896530 | B2 | 5/1999 |
| JP | 2001205503 | A | 7/2001 |
| JP | 2003514682 | A | 4/2003 |
| JP | 2007203392 | A | 8/2007 |
| JP | 5008498 | B2 | 8/2012 |
| JP | 2016083729 | A | 5/2016 |
| JP | 2016144843 | A | 8/2016 |
| JP | 2017518487 | A | 7/2017 |
| JP | 2018008354 | A | 1/2018 |
| JP | 2020082263 | A | 6/2020 |
| JP | 2020199619 | A | 12/2020 |
| JP | 2021000665 | A | 1/2021 |
| JP | 2021003775 | A | 1/2021 |
| JP | 2022552969 | | 12/2022 |
| JP | 7301241 | | 6/2023 |
| KR | 20110000780 | A | 1/2011 |
| WO | 0194061 | A1 | 12/2001 |
| WO | 2005065869 | A1 | 7/2005 |
| WO | 2021229738 | | 11/2021 |

OTHER PUBLICATIONS

International Search Report for International Application No. PCT/JP2022/021784, dated Jul. 19, 2022, 5 pages.

Office Action, issued in Japanese Application No. 2022-552969, dated Feb. 7, 2023, 6 pages.

Office Action, issued in Japanese Application No. 2022-552969, dated Oct. 14, 2022, 6 pages.

Written Opinion for International Application No. PCT/JP2022/021784, dated Jul. 19, 2022, 4 pages.

European Patent Office, Supplementary European Search Report dated Oct. 15, 2024, from related European Patent Application No. 22811416.1, 5 pages.

Greenway, Swiss Type CNC Lathe, believed to be publicly available before Jan. 19, 2021, 5 pages.

Renishaw, RLP40 radio transission lathe probe, 2013, 6 pages.

Sme, Swiss Machining Made Simpler, ME Staff Report, Jan. 30, 2019, 28 pages.

U.S. Appl. No. 17/334,604, filed May 28, 2021.

U.S. Appl. No. 17/941,953, filed Sep. 9, 2022.

YouTube Video entitled "CNC Langdrehautomat star* SR-20RIV", https://www.youtube.com/watch?v=DrZjWTUFK6U, published Mar. 19, 2013, Disclosing Screen Captures, 26 pages.

YouTube Video entitled "Star Micronics SR-20R IV Sliding Head Lathe Demonstration", https://www.youtube.com/watch?v=bVoTynHuN8o, published Oct. 1, 2012, Disclosing Screen Captures, 24 pages.

NomuraSwiss, CNC Swiss-Style Turning and Multi-Axis Machining, believed to be publicly available before Aug. 17, 2022, 8 pages.

NomuraSwiss, Swiss Type CNC Auto Lathe Series, believed to be publicly available Apr. 2022, 30 pages.

Office Action, issued in Japanese Application No. 2023-097044, dated Jul. 30, 2024, 8 pages (with English translation).

Office Action, issued in Japanese Application No. 2023-097045, dated Jul. 30, 2024, 14 pages (English translation).

* cited by examiner

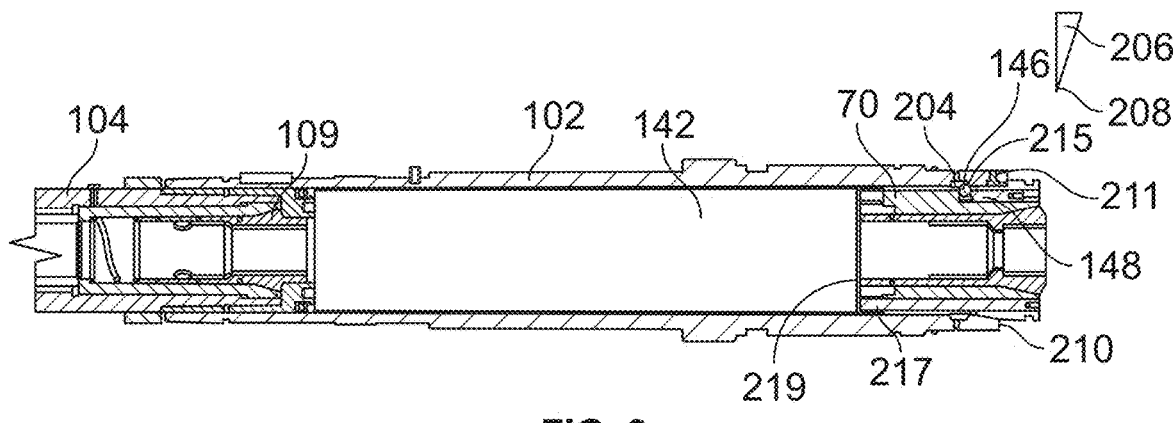
FIG. 9
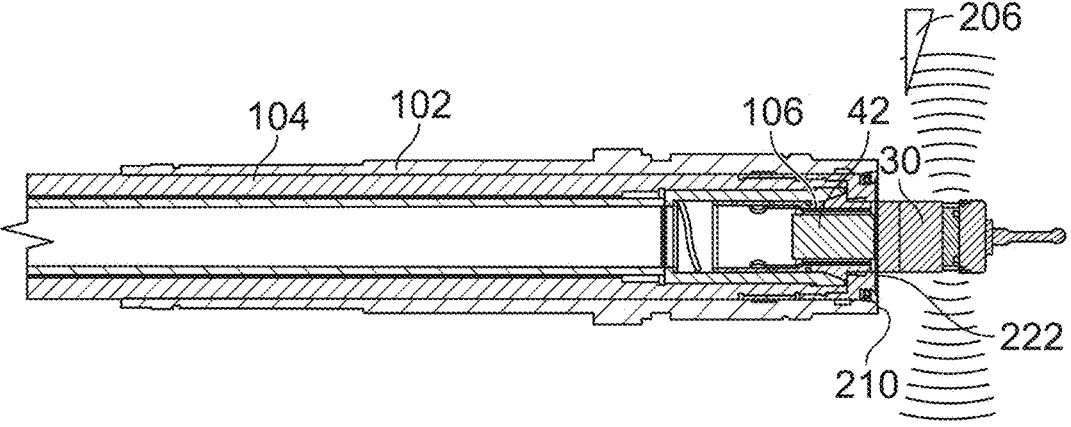
FIG. 10
FIG. 11

MACHINE TOOL

FIELD

This disclosure relates to machines tools and, more specifically, to Swiss-type machine tools.

BACKGROUND

Swiss-type machine tools have a head that rotates a workpiece around an axis and tools that are brought into contact with the rotating workpiece to machine the workpiece. The head of the Swiss-type machine tool includes a shaft that is secured to the workpiece so that the workpiece extends in a cantilevered manner therefrom. A motor of the Swiss-type machine tool rotates the shaft and workpiece secured thereto. The Swiss-type machine tool shifts the shaft from a retracted position to an extended position which causes corresponding axial shifting of the workpiece. The axial shifting of the workpiece allows the machine tool to position a portion of the workpiece for being machined by cutting tools of the Swiss-type machine tool. Typically, the cutting tools of the Swiss-type machine tool are provided in an array of tool holders that is shiftable in X- and Y-axes relative to the workpiece to bring tools supported by the tool holders into contact with the outer diameter of the workpiece to be machined, whereas the Z-axis motion comes from axial movement of the workpiece rather than movement of the array of tool holders.

The head has a guide bushing to support the workpiece as the workpiece rotates and shifts axially. The tool holder array is near the guide bushing along the axis of rotation of the workpiece so that the tools of the tool holder array may machine the workpiece when only a small portion of the workpiece protrudes beyond the guide bushing, and therefore near the support for the workpiece provided by the guide bushing even if the workpiece is relatively long. Thus, Swiss-type machine tools are particularly effective for machining long and slender parts.

Before a Swiss-type machine tool is ready to machine a workpiece, a user sets up the machine tool including programming the positions of tools of the tool holder array relative to the workpiece. In one approach, the user loads the tools into the tool holder array and loads a dummy workpiece into the head of the machine tool. The user utilizes a keyboard to provide information (e.g., diameter and length) regarding the dummy workpiece, initiate rotation of the dummy workpiece, and advance one of the tools into machining contact with the dummy workpiece. The user stops the operation after the tool has cut into the dummy workpiece, measures the depth of the cut in the dummy workpiece, and provides the depth measurement to the machine tool via the keyboard.

The machine tool uses the depth of the cut in the dummy workpiece and the distance the tool traveled to learn positions of the tool relative to the head. The user then repeats the process for the other tools in the tool holder array that will be used to machine a workpiece. The manual setup of the Swiss-type machine tool requires a significant amount of time, considering that some Swiss-type machine tools have tool holder arrays with twenty or more tools. The significant setup time of conventional Swiss-type machine tools adversely affects manufacturing efficiency.

SUMMARY

In accordance with one aspect of the present disclosure, a Swiss-type machine tool is provided that includes a workpiece holding shaft, a workpiece supporting shaft, and a tool holder associated with the workpiece supporting shaft for holding at least one tool. The machine tool includes a drive operable to rotate the workpiece holding shaft and the workpiece supporting shaft around an axis. The workpiece holding shaft has a work holder, such as a collet, configured to secure a workpiece to the workpiece holding shaft. The workpiece holding shaft and the workpiece supporting shaft are axially shiftable relative to one another to adjust a position of the workpiece relative to the workpiece supporting shaft. The machine tool further includes a removable workpiece support, such as a guide bushing, configured to be releasably connected to the workpiece supporting shaft and rotate therewith. The workpiece support slidably contacts the workpiece and permits axial movement of the workpiece relative to the workpiece support. Because the workpiece support is removable from the workpiece supporting shaft, the workpiece support may be removed to permit access to the workpiece holding shaft. Further, the workpiece holding shaft has an axially extended position relative to the workpiece supporting shaft that permits a probe to be connected to the workpiece holding shaft with the workpiece support removed from the workpiece supporting shaft. In this manner, for example, a probe may be used to automate a presetting process of the machine tool despite the close axial proximity of the workpiece supporting shaft and the tool holder which is characteristic of Swiss-type machine tools.

The present disclosure also is directed to a machine tool including a spindle assembly, at least one tool holder associated with the spindle assembly, and a drive operable to rotate the spindle assembly around an axis. The spindle assembly includes an opening and a work holder. The machine tool further includes a probe configured to be connected to the work holder of the spindle assembly and sized to fit in the opening of the spindle assembly. The work holder has an extended position wherein the work holder is positioned to receive the probe and a retracted position wherein at least a portion of the probe is in the opening of the spindle assembly. The work holder, in the extended position, facilitates connecting of the probe to the work holder. Once the probe has been connected to the work holder, the work holder retracts wherein at least a portion of the probe is in the spindle assembly. By receiving the at least a portion of the probe in the opening spindle assembly, the axial distance the probe protrudes forward of the spindle assembly can be minimized and permits a sensing portion of the probe to be radially aligned with the tool holder which may be adjacent the spindle assembly along the axis.

In another aspect, a machine tool is disclosed that includes a workpiece holding shaft, a workpiece supporting shaft, and a work holder of the workpiece holding shaft. The machine tool includes at least one drive operable to rotate the workpiece holding shaft and the workpiece supporting shaft around an axis. The drive is further operable to axially shift the workpiece holding shaft and the workpiece supporting shaft relative to one another. The machine tool includes a tool holder associated with the workpiece supporting shaft and a tool holder actuator operable to move the tool holder. The machine tool has a user interface to receive a setup command, such as when a user wants to setup the machine tool to use a specific tool to machine a workpiece. The machine tool further includes a controller, upon receiving the setup command via the user interface, configured to cause the drive to shift the workpiece holding shaft to an extended position to permit connecting of the probe to the workpiece holding shaft. The controller is further configured to cause the tool holder actuator to move the tool holder to bring the tool into contact with the probe. The controller then determines tool setup data based upon a signal from the probe and the movement of the tool holder. In this manner, the machine tool autonomously learns the relative positions of the tool holder and the probe by moving the tool into contact with the probe so that the machine tool may be setup to machine a workpiece once the probe has been removed and replaced with the workpiece. The machine tool facilitates rapid presetting of the machine tool to utilize a large number of tools, such as twenty or more tools.

The present disclosure also is directed to a method of operating a machine tool having a workpiece holding shaft and a workpiece supporting shaft that are rotatable about an axis during a machining operation. The method includes axially shifting the workpiece holding shaft and the workpiece supporting shaft relative to one another to position the workpiece holding shaft at an axially extended position relative to the workpiece supporting shaft. The workpiece holding shaft includes a workpiece holder that is positioned to receive a probe with the workpiece holding shaft at the extended position. The method includes axially shifting the workpiece holding shaft and the workpiece supporting shaft relative to one another with the probe connected to the workpiece holder to position the workpiece holding shaft at an axially retracted position relative to the workpiece supporting shaft. A tool holder of the machine tool is moved to bring a tool supported in the tool holder into contact with the sensing portion of the probe. Further, the method includes determining setup data for the tool based at least in part upon a signal from the probe and the moving of the tool holder. Because the probe is connected to the workpiece holder, the probe moves with the workpiece holding shaft to the retracted position. The retracting of the probe permits a sensing portion of the probe to be positioned only a short axial distance beyond the workpiece holding shaft even when the overall axial length of the probe is two or more times greater than the short axial distance.

In another aspect, the present disclosure includes a computer readable medium having instructions stored therein that, when executed by a processor of the machine tool, cause the machine tool to perform operations including axially shifting a workpiece holding shaft and a workpiece supporting shaft of the machine tool relative to one another to position the workpiece holding shaft at an extended position relative to the workpiece supporting shaft. The workpiece holding shaft includes a workpiece holder that is positioned to receive a probe with the workpiece holding shaft at the extended position. The operations further include axially shifting the workpiece holding shaft and the workpiece supporting shaft relative to one another with the probe connected to the workpiece holder to position the workpiece holding shaft at a retracted position relative to the workpiece supporting shaft. A tool holder of the machine tool is moved to bring a tool of the tool holder into contact with the probe. Further, the operations include determining setup data for the tool based at least in part upon a signal from the probe and the moving of the tool holder. The axial shifting of the workpiece holding shaft relative to the workpiece supporting shaft to the retracted position moves the probe from the forward extended position rearward relative to the tool holder and permits aligning of a sensing portion of the probe with the tool holder. The machine tool may utilize a macro to autonomously move the tool into contact with the sensing portion of the probe and store the movement parameters used to bring the tool into contact with the sensing portion of the probe. The autonomous tool learning process avoids the time-intensive, conventional approach for setting up Swiss-type machine tools using dummy workpieces as discussed above.

The present disclosure also provides a machine tool having a workpiece holding shaft, a workpiece supporting shaft, and a tool holder associated with the workpiece supporting shaft for holding at least one tool. The machine tool has a drive to rotate one of the workpiece holding shaft and the workpiece supporting shaft around an axis. The machine tool further includes a ball spline connection of the workpiece holding shaft and the workpiece supporting shaft configured to transfer the rotation of the one of the workpiece holding shaft and the workpiece supporting shaft to rotation of the other of the workpiece holding shaft and the workpiece supporting shaft. The ball spline connection permits axial shifting of the workpiece holding shaft and the workpiece supporting shaft relative to one another to axially adjust a position of the workpiece relative to the workpiece supporting shaft while providing accurate rotary positioning of the workpiece.

In one aspect of the present disclosure, a machine tool is provided including an artifact, a head having a rotatable workpiece holder, and a probe configured to be mounted to the workpiece holder. The machine tool further includes a tool holder for holding a tool and a tool holder actuator operable to move the tool holder. The machine tool further includes a controller configured to calibrate the probe by moving the probe and the artifact relative to one another to bring the probe and the artifact into contact with one another. For example, the controller measures the distances the probe and the artifact travel relative to one another in $X1,Y1$, and/or $Z1$ directions from their initial positions until the probe and artifact contact one another. Usually, the probe will only move in $Z1$ directions while the artifact will move in the $X1$ and $Y1$ directions for the calibration procedure, although that need not necessarily be the case for the calibration procedure. The artifact has a known, preset location in the machine tool and the controller may thereby calibrate the probe, such as determining a Z-axis offset value and a centerline of the probe, using the known location of the artifact and the relative movement of the probe and artifact. In one approach, the Z-axis offset value is a distance between a tool tip and a master tool along the $Z1$ axis.

The controller is configured to determine a tool offset value for the tool using data from calibrating the probe and by moving the probe and the tool holder relative to one another to bring the probe and the tool into contact with one another. The tool offset value for the tool permits the controller to accurately position the tool relative to a workpiece held in the head. As an example in this regard, the controller uses the Z-axis offset value of a leading end surface of the probe determined when calibrating the probe and the relative movement of the probe and the tool holder to determine a Z-axis offset value for the tool. By calibrating the probe using the artifact of the machine tool, the controller may then use the calibrated probe to rapidly determine the tool offset values for one or more tools of the machine tool. In this manner, the machine tool may be setup for machining a workpiece in a matter of minutes rather than hours or days as in the conventional approach for setting up a Swiss-type machine tool described in the background section of this disclosure.

In another aspect of the present disclosure, a method is provided for preparing a machine tool to machine a workpiece. The machine tool includes an artifact in the machine tool and a probe mounted to a head of the machine tool. The method includes determining a tool offset value for a tool by moving the probe and the tool relative to one another to bring the probe and the tool into contact with one another. Prior to determining the tool offset value, the method includes calibrating the probe by moving the probe and the artifact relative to one another to bring the probe and the artifact into contact with one another. Using an artifact of the machine tool to calibrate a probe, and using the probe to determine tool offsets, permits the method to significantly reduce machine tool setup times in comparison to the conventional approach of an operator programming the tool offsets into the machine one tool at a time by using each tool to machine a dummy workpiece as discussed above.

BRIEF DESCRIPTION OF THE DRAWINGS

FIG. 9 is a cross-sectional view of a portion of the spindle assembly showing the spline shaft in a retracted position and the guide bushing secured to the spindle shaft;

FIG. 10 is a view similar to FIG. 9 showing the guide bushing removed from the spindle shaft to permit access to the interior of the spindle shaft;

FIG. 11 is a view similar to FIG. 10 showing the spline shaft in an extended position and the probe of FIG. 5A connected to the spline shaft;

DETAILED DESCRIPTION

Figure 1:
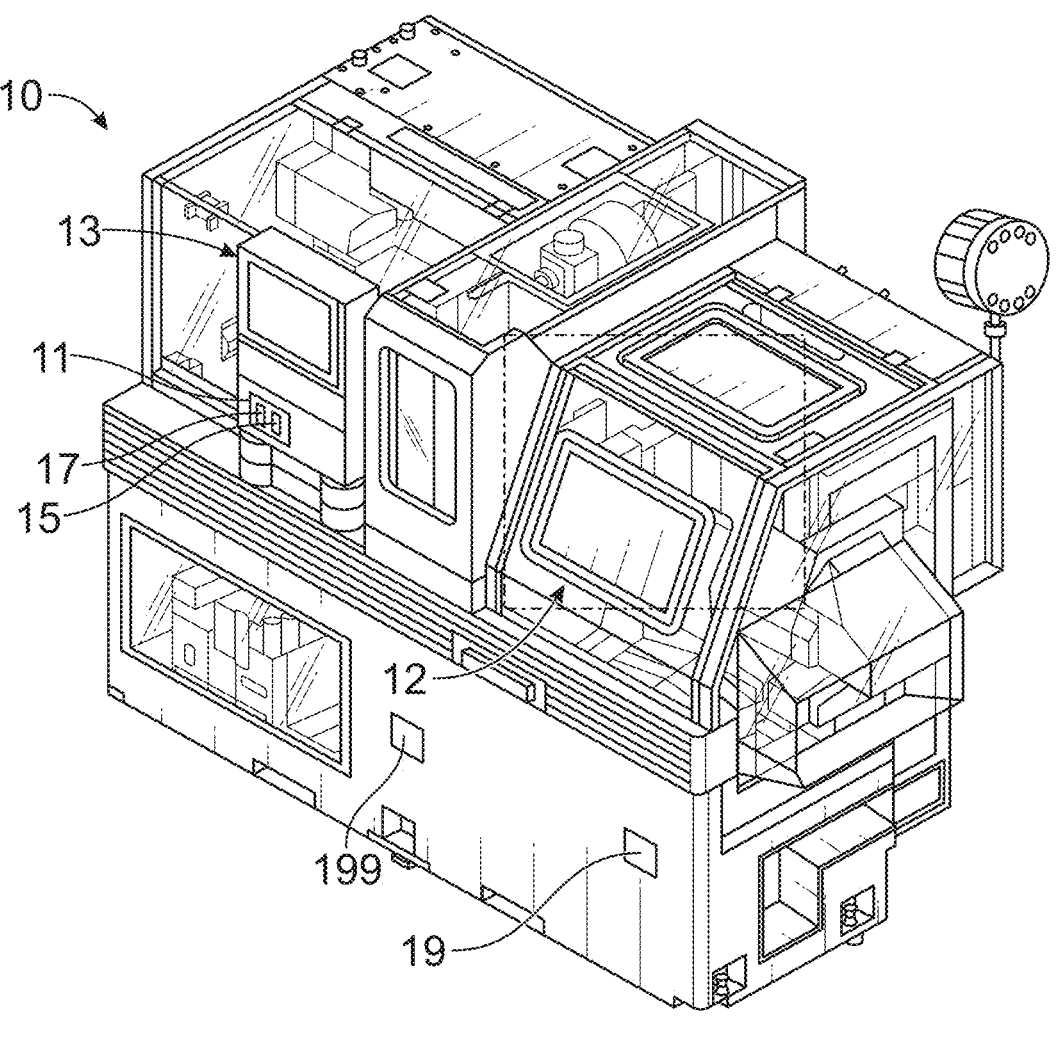
FIG. 1 is a perspective view of a high-speed Swiss-type machine tool.

In FIG. 1, a machine tool, such as a high-speed Swiss-type machine tool 10, is illustrated having a machining area 12.

The machine tool 10 has a controller 11 operably coupled to various motors and components of the machine tool 10 to facilitate operation of the machine tool 10. The machine tool 10 has a user interface 13, such as screen, a keyboard, microphone, and/or a speaker to receive user inputs and provide information to the user. The controller 11 includes a memory 15 to store instructions for operating the machine, such as one or more macros, and a processor 17 to implement the instructions. The machine tool 10 permits rapid presetting or setup of the tooling of the machine and, in some embodiments, automated setup of the machine tooling. The machine tool 10 has a first head 14 including a removable workpiece support, such as a guide bushing 70 (see FIG. 7), that is removable from a spindle shaft 102 (see FIG. 6) of the first head 14 to permit a probe 30 to be connected to a spline shaft 104 of the first head 14. The machine tool 10 utilizes the probe 30 to detect when a tool associated with the first head 14 contacts the probe 30 as part of identifying the positions of workpiece engaging portions of the tools relative to an axis of rotation of the first head 14.

Figure 3:
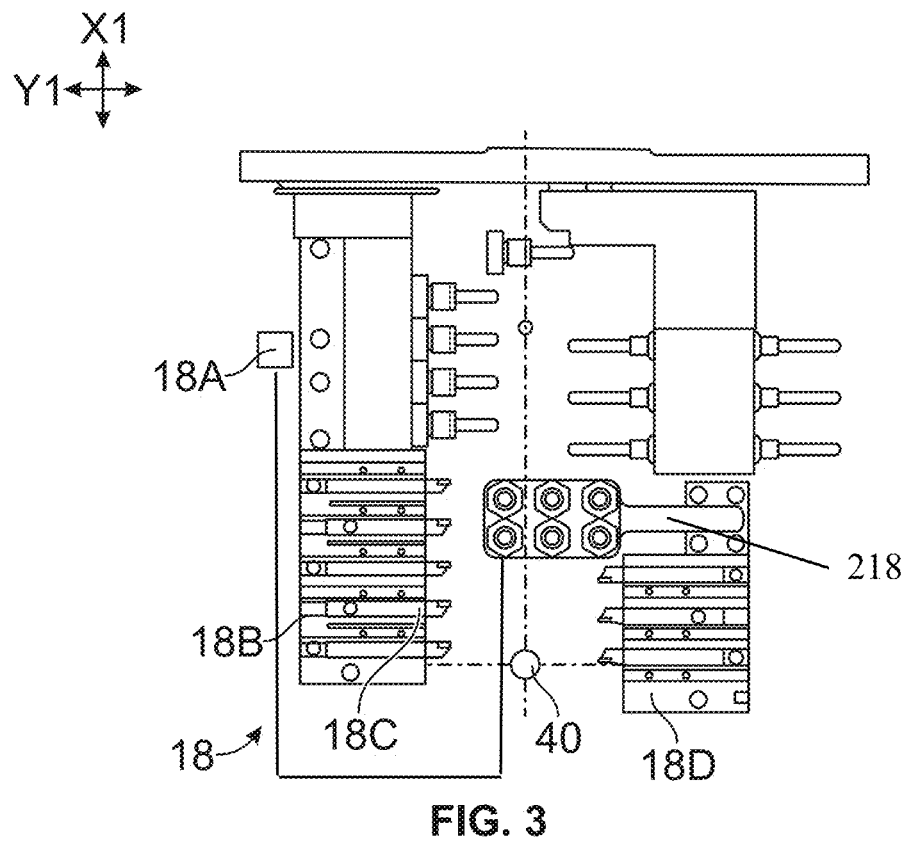
FIG. 3 is an elevational view of the first tool holder array of the machine tool of FIG. 1 showing tools of the first tool holder array for machining the workpiece supported by the first head.

More specifically, the machine tool 10 such as via the controller 11 thereof receives tool data regarding tools associated with the first head 14 via the user interface 13 or communication circuitry 19 of the machine tool 10 and its controller 11. The communication circuitry 19 may include, for example, one or more of a network connection to connect to a local wired or wireless network, a short-range wireless interface such as a RFID reader to read RFID tags of the tools, a wired interface to receive data from a memory of each tool, and/or an optical reader to detect information from a machine-readable indicium such as a barcode of the tool. The controller 11 is operable to cause one or more tool holder actuators 18A (see FIG. 3) to advance a tool holder 18B of the tool holder assembly or array 18 from an initial position until a tool 18C of the tool holder 18B contacts the probe 30 which is located at or near a machining position of a workpiece mounted to the first head 14. The tool holder actuators 18A may include, for example, an electric motor, a linear actuator, a ball-and-screw drive, etc. The controller 11 learns the tool setup data associated with moving the tool 18A from the initial position into contact with the probe 30 and subsequently returns the tool to its initial position. The machine tool 10 repeats the advancing and learning process for one or more other tools associated with the first head 14 that are to be utilized for a given machining operation. Once the controller 11 has determined the tool setup data, the guide bushing 70 is reinstalled on the spline shaft 104. The machine tool 10 receives data regarding the workpiece, such as material and diameter, as well as process instructions for machining a workpiece. The controller 11 uses the tool setup data to implement the process instructions and machine the workpiece.

Figure 2:
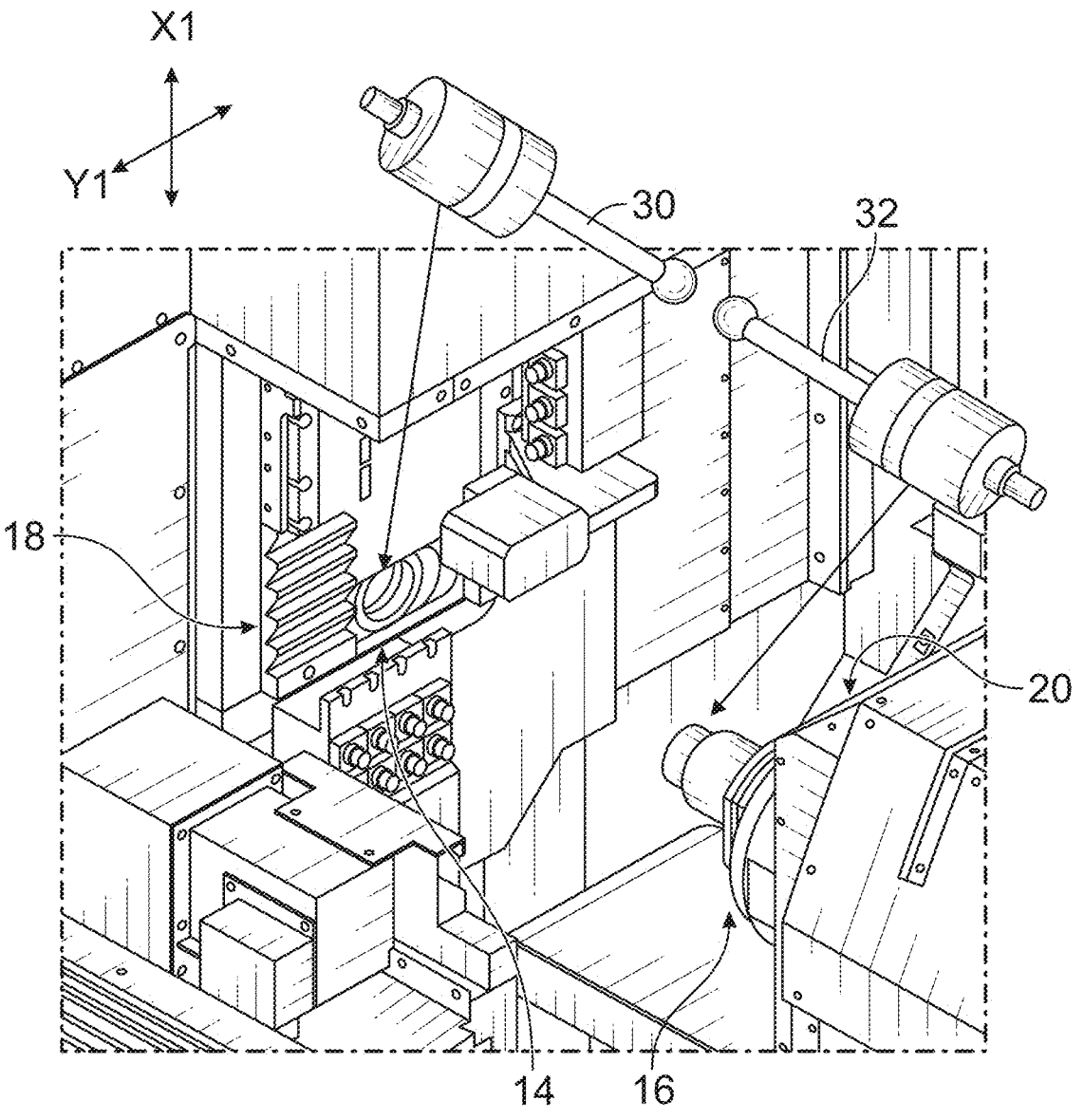
FIG. 2 is a view of an interior of a machining area of the Swiss-type machine tool of FIG. 1 shown generally with the dashed box in FIG. 1, the machining area having first and second heads that receive a workpiece and rotate the workpiece relative to a first tool holder array and a second tool holder array.
Figure 4:
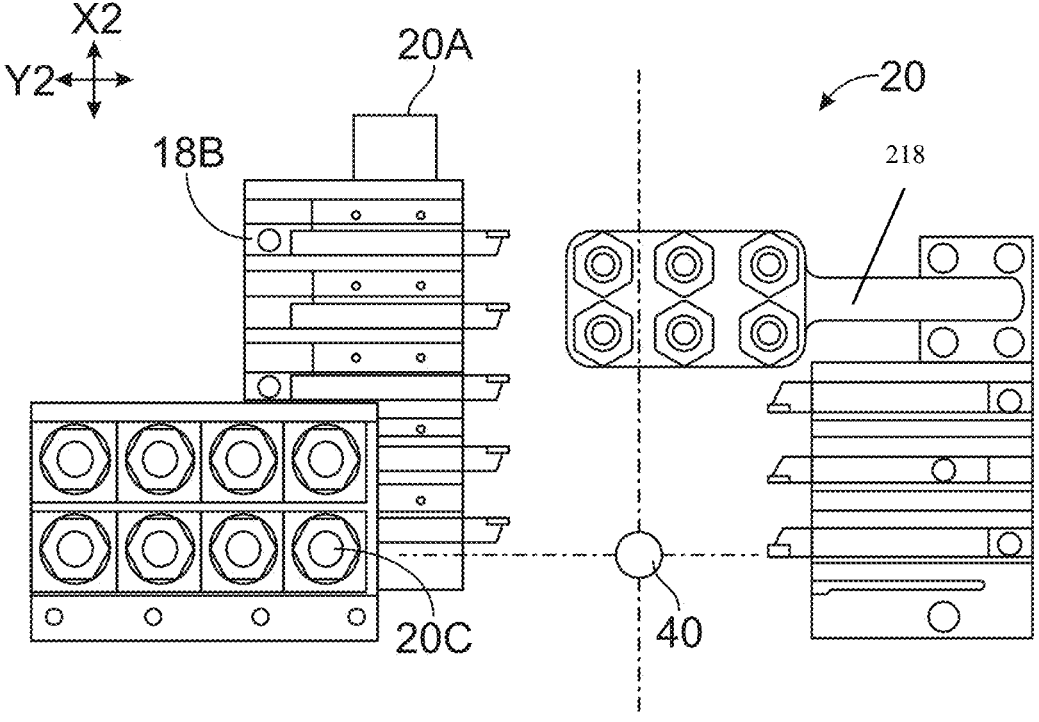
FIG. 4 is an elevational view of the second tool holder array of the machine tool of FIG. 1 showing tools of the second tool holder array for machining the workpiece supported by the second head.

With reference to FIG. 2, an interior of the machining area 12 is shown. The machine tool 10 includes a first head 14 and a second head 16. The first head 14 receives an elongate workpiece, typically a rod, and rotates the workpiece so that the workpiece may be machined by tools of a first tool holder array 18 (see also FIG. 3). The first tool holder array 18 includes tool holders 7 (see FIG. 20A) that each receive an associated tool. The second head 16 may support an end of the workpiece held by the first head 14 or may be used independently of the first head 14. The workpiece received in the second head 16 may be machined by tools of a second tool holder array 20 (see FIG. 4). The first and second tool holder arrays 18, 20 are components of a tool holder system 3 (see FIG. 20A) of the machine tool 10. The first tool holder array 18 may include one or more tool holders of the second tool holder array 20, or vice versa. Elevational views of the first and second tool holder arrays 18, 20 are provided in FIGS. 3 and 4.

With reference to FIG. 2, the machine tool 10 has a probe 32 for setting up the machine tool 10 to utilize tools of the tool holder array 20 to machine a workpiece in the second head 16. Like the presetting process for the first head 14, the controller 11 causes one or more tool holder actuators 20A to move tool holders 20B and bring tools 20C into contact with the ball 40 of the probe 30. The processor determines setup data based on the movement of the tool holders 20B and signals from the probe 32 once the tools contact the ball 40.

Figure 5A:
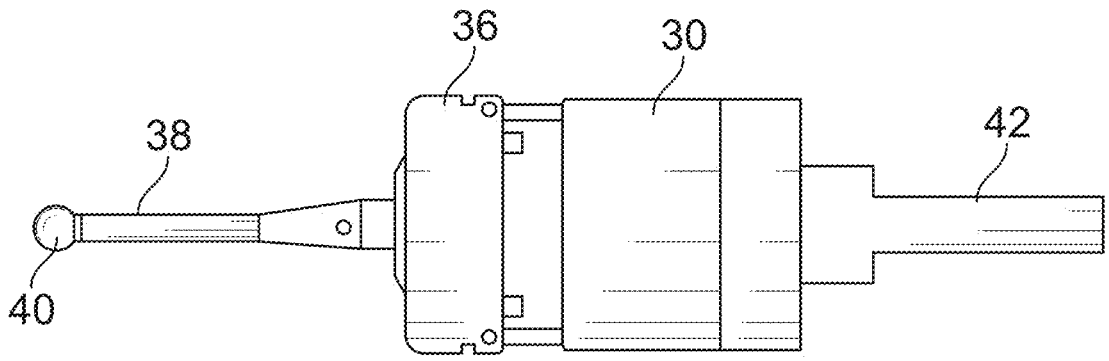
FIG. 5A is a side elevational view of a probe having an adapter portion to be connected to a collet of the first head, the probe having a stylus with a ball tip for contacting tools of the first tool holder array during a tool presetting operation.
Figure 5B:
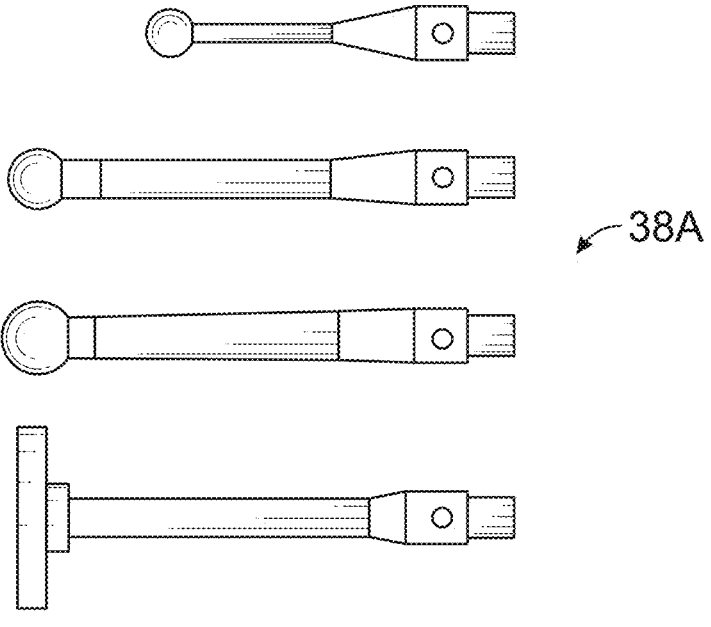
FIG. 5B is a side elevational view of different configurations of styluses that may be used with the probe of FIG. 5A.

Referring to FIG. 5A, the probes 30, 32 are similar and each include a body 36 containing sensing and communication circuitry, an elongate stylus 38 having a sensor sphere 40 at a distal end thereof, and an adapter portion 42 configured to be secured by a collet of the first or second head 14, 16. The body 36 and stylus 38 may be releasably connected. Referring to FIG. 5B, different styluses 38A are provided that may be used depending on a particular application. The probes 30, 32 may be off-the-shelf products such as a Renishaw RLP 40 or RMP-400.

During setup of the machine tool 10, the probes 30, 32 are connected to the first and second heads 14, 16. The tool holder actuators 18A, 20A are operable to shift the first and second tool holder arrays 18, 20 in respective planes in the X1, Y1 and X2, Y2 directions. In some embodiments, the actuators 18A, 20A pivot one or more tool holders to position tools of the tool holder to contact the workpiece. The machine tool controller 11 is programmed to automatically move the first and second tool holder arrays 18, 20 and bring each tool thereof into contact with the sphere 40 of the associated probe 30, 32. Once the tool contacts the sphere 40, the probe 30, 32 sends a wireless communication to communication circuitry 19 indicating contact. In one embodiment, the wireless communication is performed using a Bluetooth® protocol.

The controller 11 determines the change in position used to bring the tool into contact with the sphere 40, which the controller then uses to determine the change in position needed to bring the tool into contact with a workpiece once the workpiece is loaded into the first or second heads 14, 16 (completing setup involves the user entering information regarding the workpiece, such as the material of the workpiece, length of the workpiece, and the outer diameter of the workpiece). The controller 11 utilizes parameters of the probes 30, 32, such as the outer diameter of the sphere 40, to determine how far in the X- and Y-directions the controller 11 had to move the tool to contact the sphere having a particular diameter. The controller 11 may then determine how far to move the tool in the X- and Y-directions to contact a workpiece having a given outer diameter that is larger or smaller than the diameter of the sphere 40. The parameters of the probes 30, 32 including the sensor sphere diameter may be provided to the controller 11 such as by a user entering the manufacturer and model number of the probes 30, 32 and/or the probes 30, 32 wirelessly communicating their parameters to the controller 11.

Figure 6:
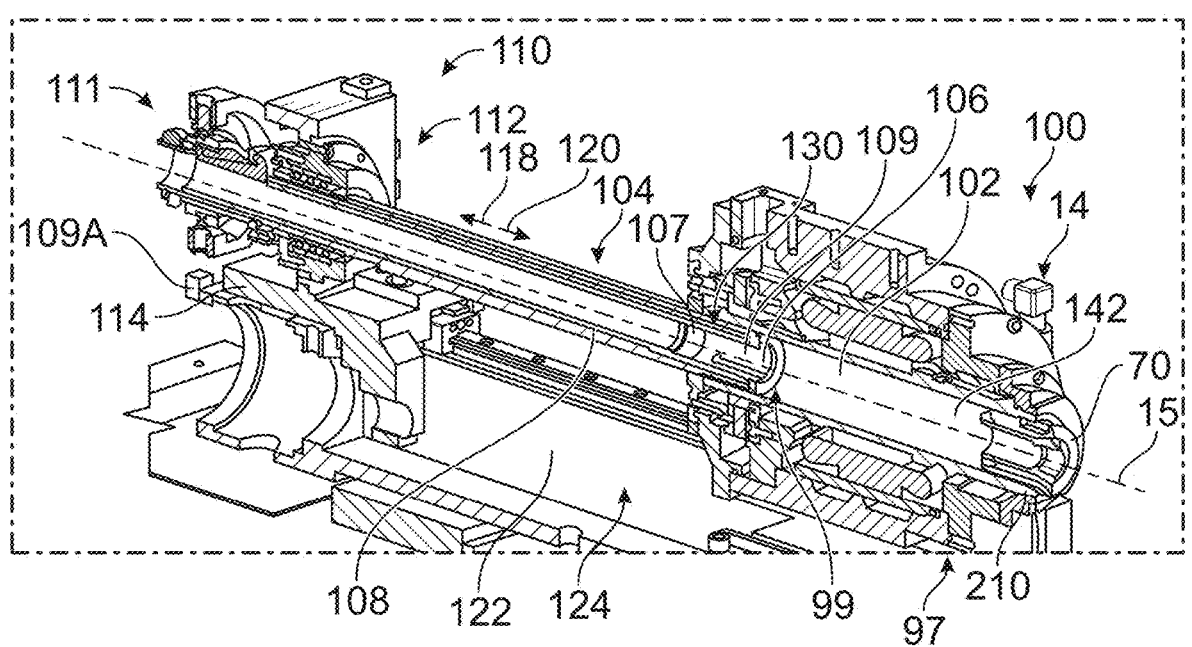
FIG. 6 is a cross-sectional view of the first head of the machine tool of FIG. 1 showing a spindle assembly including a spindle shaft of the first head, a removable guide bushing connected to the spindle shaft, a spline shaft of the spindle assembly axially shiftable relative to the spindle shaft and rotatable therewith, and a workpiece-holding collet of the spline shaft.

With reference to FIG. 6, the first head 14 includes at least one drive to rotate and axially shift the workpiece. In one embodiment, the at least one drive includes a first drive 97 having a motor 100. The first head 14 further includes a spindle assembly 99 including a workpiece supporting shaft in the form of a spindle shaft 102 and a workpiece holding shaft in the form of a spline shaft 104, and a collet assembly 106 of the spline shaft 104. The collet assembly 106 includes an adapter, such as a collet adapter 107, to engage a radially inner surface of the spline shaft 104 and a workpiece holder, such as a collet 109, to engage the workpiece. The spline shaft 104 has an interior sleeve 108 that receives a workpiece. The motor 100 may rotate the spindle shaft 102 and spline shaft 104 at high speeds, such as 10,000 RPMs or faster.

The machine tool 10 includes a rotary position sensor 199 (see FIG. 1) configured to detect a position of the spindle assembly 99, such as one or both of the spindle shaft 102 and the spline shaft 104. The rotary position sensor 199 may be a component of the motor 100 or a separate component as some examples. The controller 11 utilizes data from the rotary position sensor 199 to determine the rotary position of the workpiece and operate the motor 100 to adjust the rotary position of the workpiece. Thus, the machine tool 10 operates the motor 100 to both rotate the workpiece at a high-speed relative the tools of the first tool holder array 18 during a lathe-style procedure and provide high-accuracy rotary positioning of the workpiece relative to the tools of the first tool holder array 18.

In one embodiment, the rotary position sensor 199 includes an encoder such as an absolute and/or incremental encoder. The encoder may include an angle encoder and/or a rotary encoder as some examples. The rotatory position sensor 199 may include one or more sensors. For example, the rotatory position sensor 199 may include an encoder and a laser measurement device. The laser measurement device includes an indexer of the spindle shaft 99, a laser source, and a laser detector. The laser source directs a laser at the indexer, the laser reflects from the indexer, and the reflected laser is received at the laser detector.

In one embodiment, the controller 11 is configured to utilize data from the laser source and laser detector to determine an input correction value. The controller 11 determines the position of the spindle assembly 99 and workpiece secured therein based at least in part on data from the encoder and the input correction value. The input correction value may be continuously or periodically calculated, such as at every machine setup operation, tool change, or change in direction of the rotation of the spindle assembly 99 as some examples.

The first head 14 includes a support assembly 110 having bearing assemblies 112 that permit rotation of the spline shaft 104. The support assembly 110 further includes a support, such as a carriage 114. The machine tool 10 includes a second drive 111 operable to axially shift the carriage 114 in directions 118, 120 along a rail 122 of a frame 124 of the machine tool 10. The second drive 111 may include a motor 109A and a ball-and-screw transmission, as one example. Although the spline shaft 104 is rotatable relative to the support assembly 110 so as to be rotatably mounted thereto, the spline shaft 104 is mounted to the support assembly 110 so that shifting of the support assembly 110 in directions 118, 120 along the axis of rotation 15 causes axial shifting of the spline shaft 104. Thus, movement of the support assembly in directions 118, 120 produces corresponding movement of the spline shaft 104, collet 109, and workpiece held therein in directions 118, 120.

The spindle shaft 102 and spline shaft 104 have a slide connection 130 therebetween that permits the spine shaft 104 to shift axially in directions 118, 120 relative to the spindle shaft 102. However, the slide connection 130 includes axially extending splines of the spindle shaft 102 and spline shaft 104 that are engaged to be axially slidable relative to each other but fix the spindle shaft 102 and spline shaft 104 rotationally relative to one another. In this manner, rotation of the spindle shaft 102 causes rotation of the spline shaft 104. Thus, the spline shaft 104 may be shifted axially in directions 118, 120 via movement of the support assembly 110 as the spindle shaft 102 and spline shaft 104 rotate together.

Figure 7:
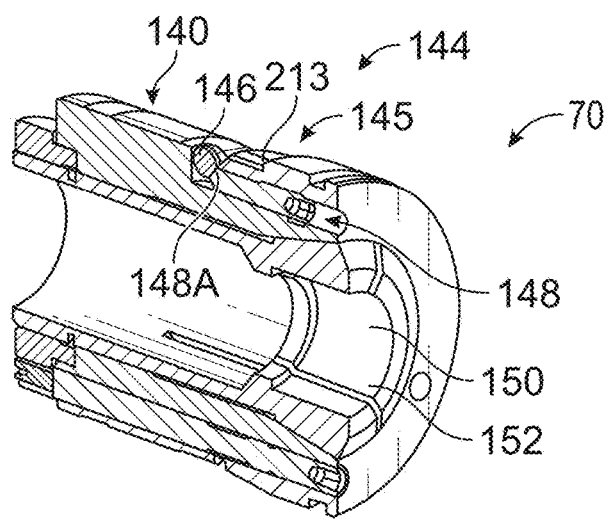
FIG. 7 is an enlarged, cross-sectional view of the removable guide bushing of FIG. 6 showing a detent mechanism for selectively securing the guide bushing to the spindle shaft.

As can be seen in FIGS. 6 and 7, the guide bushing 70 includes a body 140 sized to fit in an opening 142 of the spindle shaft 102. The guide bushing 70 has a radially outer lock 144 to releasably secure the guide bushing 70 in the spindle shaft 102. The lock 144 includes a detent mechanism 145 including one or more detent members, such as a ball 146. The lock 144 has a locked configuration wherein the ball 146 is urged radially outward to secure the guide bushing 70 in the spindle shaft 102 and an unlocked configuration wherein the ball 146 may shift radially inward and permit the guide bushing 70 to be withdrawn and removed from the spindle shaft 102. When the ball 146 is in the radially outer locked position, the ball 146 engages a radially inwardly facing annular groove 204 (see FIG. 9) of the spindle shaft 102 and fixes the guide bushing 70 to the spindle shaft 102 against relative axial movement therebetween. The detent mechanism 145 includes a set screw 148 that is tightened to lock the ball 146 in the radially outer locked position. In one embodiment, the set screw 148 has a distal end with a tapered cam surface 148A so that as the set screw 148 is advanced, the cam surface 148A engages an outer surface of the ball 146 urging it radially outward and clamps the ball 146 between the tapered surface 148A of the set screw 148 and the spindle shaft 102 in the groove 204 thereof. The set screw 148 may be loosened to retract and permit the ball 146 to shift radially inward to the unlocked position and permit the guide bushing 70 to be removed from the spindle shaft 102.

The guide bushing 70 further includes a guide collet 150 with an opening 152 that receives the workpiece. Whereas the collet 109 of the spline shaft 104 is fixed to the workpiece against relative axial and rotational movement, the guide collet 150 of the guide bushing 70 permits the workpiece to shift axially within the opening 152 via axial shifting of the spline shaft 104 so that the desired length of the workpiece may be shifted beyond the guide bushing 70 to be exposed to the tools of the tool holder array 18.

Prior to machining a workpiece using the machine tool 10, a user sets up the machine tool 10 to machine the workpiece. Initially, the user removes the guide bushing 70 from the spindle shaft 102. Next, the user interacts with the user interface 13 of the machine tool 10 and causes the machine tool 10 to advance the support assembly 110 to jog forward in direction 120 until the collet 109 in the spline shaft 104 is adjacent a forward end 210 of the spindle shaft 102. The user then loads the adapter 42 of the probe 30 into the collect 109. The user also connects the probe 32 to the second head 16.

Once the adapter 42 has been secured to the spline shaft 104 via the collect 109, the user initiates a setup process and the controller 11 of the machine tool 10 retracts the support assembly 110 and spline shaft 104 in direction 118 until the sphere 40 of the probe 30 is at an axial position along the axis of rotation 15 wherein the sphere 40 is radially aligned with the tools of the first tool holder array 18. The controller 11 of the machine tool 10 then automatically shifts the first tool holder array 18 in the X and Y directions to bring each tool into contact with the sphere 40. The controller monitors the change in position of the first tool holder array 18 as the first tool holder array 18 travels to bring each tool into contact with the sphere 40 to determine the distance between each tool and the probe 30, and specifically the outer surface of the sensor sphere 40. The controller performs a similar process to determine the relative positions of the tools of the second tool holder array 20 and the sphere 40 of the probe 32. The automated process of the controller determining the relative positions of each tool of the first and second tool holder arrays 18, 20 and the probes 30, 32 saves a user a significant amount of time, as has previously been discussed.

The body 36 of the probe 30 has a diameter that is larger than the diameter of the opening 152 of the guide bushing 70 (which has a size similar to a conventional guide bushing opening) such that the probe 30 cannot be fit through the guide bushing opening 152 and travel into the opening 142 of the spindle shaft 102. However, by removing the guide bushing 70, the body 36 of the probe 30 may be retracted into the opening 142 of the spindle shaft 102 until the sphere 40 of the probe 30 is radially aligned with the first tool holder array 18. Thus, the removable guide bushing 70 permits the probe 30 to be used with the first head 14 and facilitates automated presetting of the machine tool 10.

Figure 8:
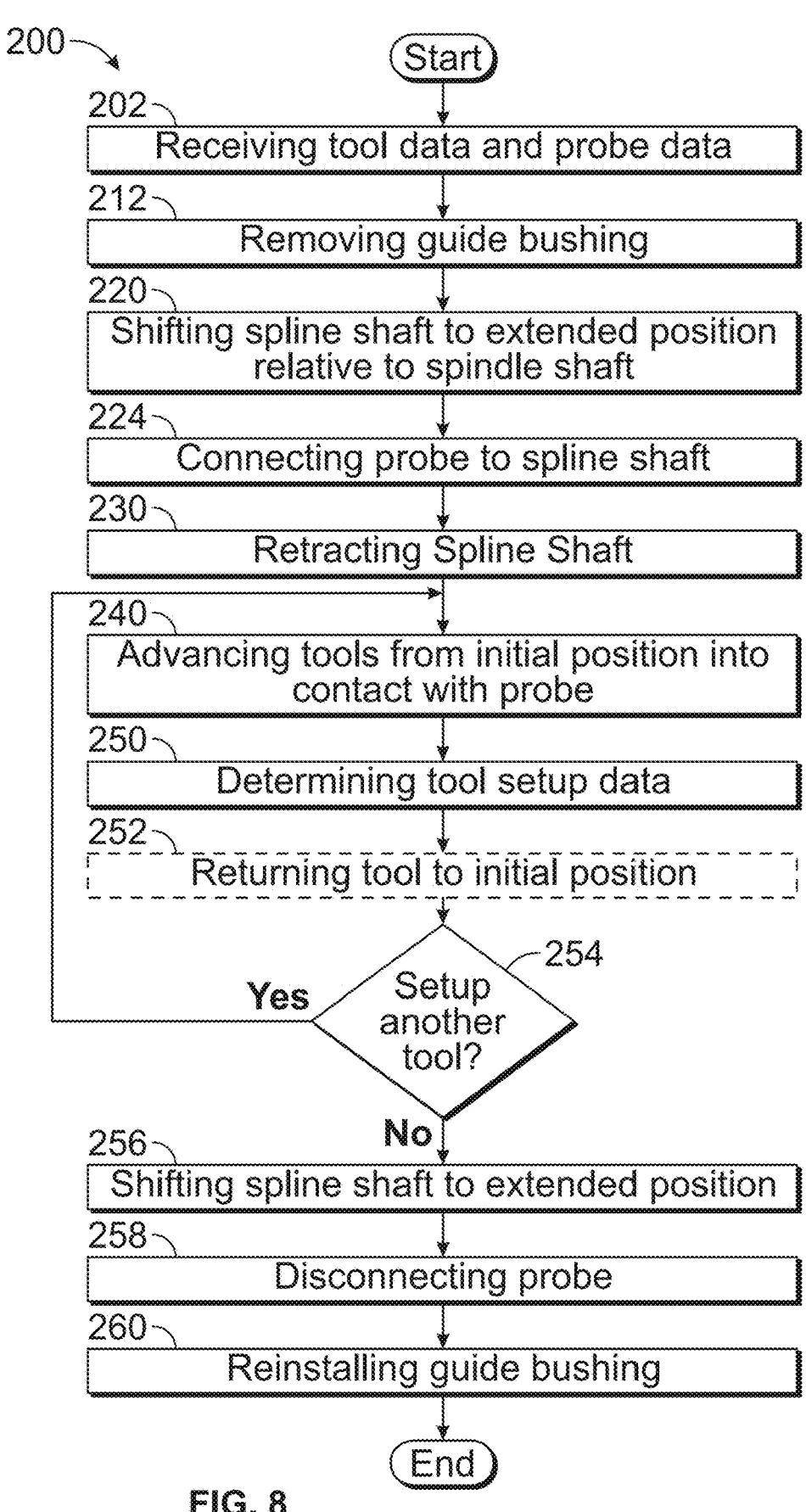
FIG. 8 is a flow diagram of a presetting operation of the machine tool of FIG. 1.

Referring to FIG. 8, a method 200 of presetting the machine tool 10 is provided and discussed with respect to FIGS. 9-13. The method 200 includes receiving 202 tool data and probe data. The step of receiving 202 the data may include a user inputting data regarding one or more tools and the probe 30 to the controller 11 of the machine tool 10 using the user interface 13. The tool data may include, for example, information identifying the type, size, intended material, and manufacturer of the tool. The probe data may include, for example, information relating to the manufacturer, model number, stylus, and/or wireless communication protocol of the probe 30. In some embodiments, the machine tool 10 or controller 11 thereof receives the tool data and the probe data via wired or wireless communication approaches, such as by receiving tool data from RFID tags of the tools and receiving the probe data upon pairing with the probe 30 such by using a Bluetooth® connection.

Regarding FIG. 9, the guide bushing 70 is shown secured to the spindle shaft 102 with the detent mechanism 145 of the guide bushing 70 in the locked configuration such that the ball 146 is urged radially outward to project radially outward partially beyond the guide bushing 70 and to be partially received in the groove 204 of the spindle shaft 102. The upper half of the ball 146 overlaps a radially extending stop surface 215 of the groove 204 in a radial direction. With the guide bushing 70 inserted in the spindle shaft opening 142 so that an axially inner end portion 217 of the guide bushing 70 seats against a seating surface 219 of the spindle shaft 102, and the lock 144 shifted to its locked configuration with the ball 146 engaging the stop surface 215 of the groove 204, the guide bushing 70 is fixed against axial movement relative to the spindle shaft 102. Further, a tool 206 of the first tool holder array 18 is positioned with a workpiece engaging or cutting portion 208 thereof in proximity to a forward end 210 of the spindle shaft 102.

The method 200 includes removing 212 the guide bushing 70. For example, the step of removing 212 the guide bushing 70 includes a user loosening the set screw 148 to retract it away from the ball 146 permitting the ball 146 to shift radially inward and out from the groove 204. The spindle shaft 102 can include a key 211 that engages an axial keyway 213 (see FIG. 7) of the guide bushing 70 to further inhibit relative rotation between the guide bushing 70 and the spindle shaft 102. Thus, the step of removing 212 the guide bushing 70 may also include disengaging the key 211 from the keyway 213. With reference to FIG. 10, the spindle shaft 102 and spline shaft 104 are shown with the guide bushing 70 removed.

The method 200 includes shifting 220 the spline shaft 104 to an extended position relative to the spindle shaft 102 as shown in FIG. 11. In the extended position, the spline shaft 104 has a forward end 222 that is level with, or slightly axially outward or inward of, the forward end 210 of the spindle shaft 102.

The method 200 includes connecting 224 the probe 30 to the spline shaft 104. The step of connecting 224 the probe 30 may include securing the rear adapter portion 42 of the probe 30 in the collet 109 of the spline shaft 104. FIG. 11 shows the spline shaft 104 after the adapter portion 42 is secured in the collet 109.

Figure 12:
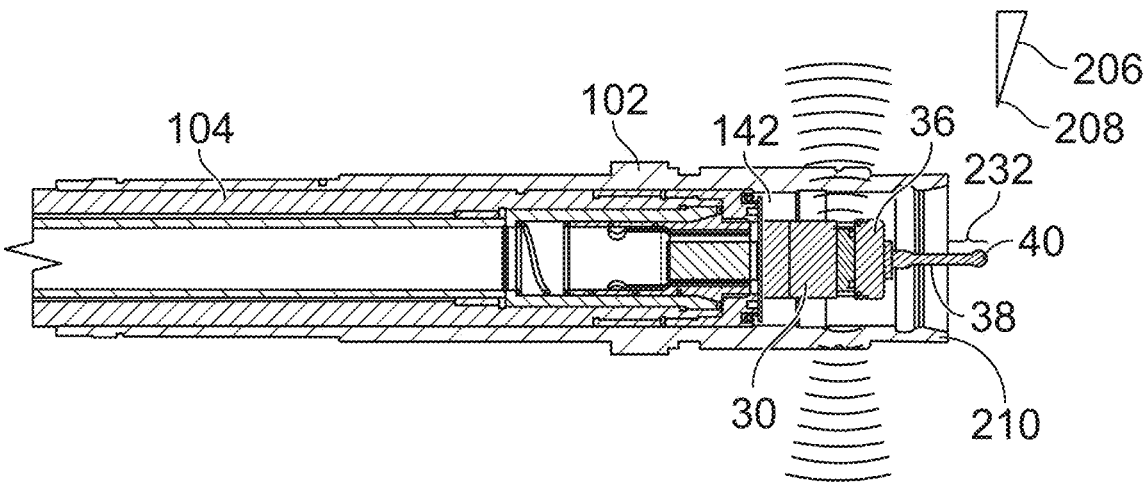
FIG. 12 is a view similar to FIG. 11 showing the spline shaft in an intermediate retracted position, the probe retracted into the interior of the spindle shaft, and the ball tip of the projecting stylus radially aligned with a cutting tool of the first tool holder array.
Figure 13:
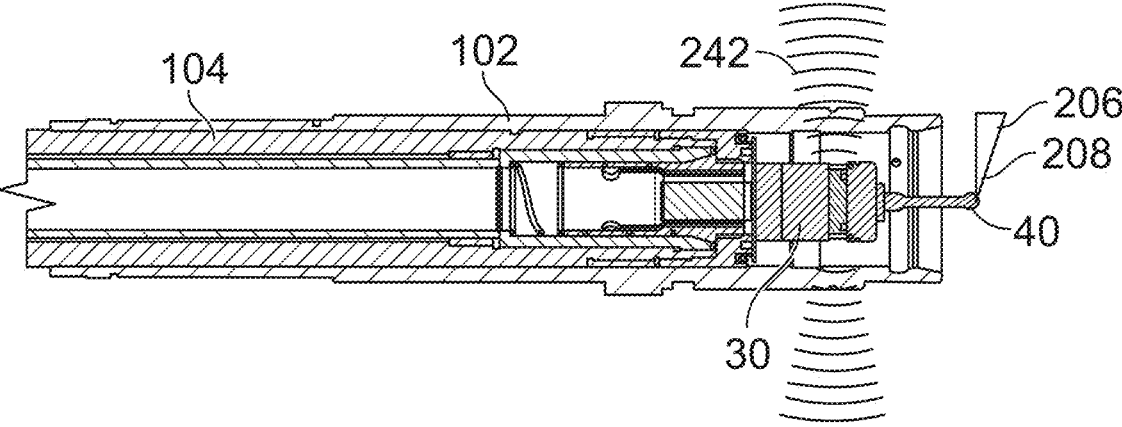
FIG. 13 is a view similar to FIG. 12 showing the cutting tool shifted radially downward to contact the ball tip of the probe.

The method 200 includes retracting 230 the spline shaft 104 from the extended position such as to an intermediate position as shown in FIG. 12. In the intermediate position, the spline shaft 104 is positioned so that the probe 30 mounted thereto is drawn partially into the opening 142 of the spindle shaft 102. As shown in FIG. 12, the entire body 36 of the probe 30 is received in the opening 142 of the spindle shaft 102 and a forward portion 232 of the stylus 38 including the sensor ball 40 protrudes forward of the forward end 210 of the spindle shaft 102. With the spline shaft 104 in the intermediate position, the ball 40 of the probe 30 is radially aligned with the workpiece engaging or cutting portion 208 of the tool 206.

The method 200 includes advancing 240 the tool 206 from an initial position into contact with the ball 40 of the probe 30. The user may participate in operation 240 such as by directing the movement of the first tool holder array 18 to bring the tool 206 into contact with the probe 30 using the user interface. In one embodiment, the tool holder supporting the tool 206 is constrained to move in the X- and Y-axes (see FIG. 2) with the tool holder array 18, such that the tool 206 is brought into contact with the probe 30 by shifting of the tool holder array 18 in X- and/or Y-directions. Upon the tool 206 contacting the probe 30, the probe 30 sends a wireless communication 242 (see FIG. 11) that is received by the communication circuitry 19. The communication indicates that the probe 30 detected the tool 206 contacting the ball 40.

The method 200 includes determining 250 tool setup data. The step of determining 250 tool setup data utilizes the change in the X-, Y-, and/or Z-coordinates and/or angular coordinates that the tool holder 18B underwent as the machine tool 10 advanced the tool 206 into contact with the probe.

The method 200 optionally includes returning 252 the tool 206 to the initial position. The step of returning 252 the tool 206 removes the tool 206 out of the way so that another tool of the first tool holder array 18 may be brought into contact with the probe 30.

The method 200 includes determining 254 whether to set up another tool. If so, the method 200 performs the advancing 240, determining 250, and returning 252 operations with the next tool of the first tool holder array 18.

Once the tools of the tool holder array 18 that are going to be utilized to machine a workpiece have been set up, the method 200 includes shifting 256 the spline shaft 104 to an extended position relative to the spindle shaft 102 such as the position shown in FIG. 11. The shifting 256 of the spline shaft 104 to the extended position positions the probe 30 to be disconnected from the spline shaft 104, such as by shifting the spline shaft 104 until the body 36 of the probe 30 is beyond of the forward end 210 of the spindle shaft 102.

The method 200 further includes disconnecting 258 the probe 30 from the spline shaft 104 and reinstalling 260 the guide bushing 70 in the spindle shaft 102. Once the method 200 is completed, the machine tool 10 is ready to machine a workpiece upon receiving machining instructions.

One or more steps or operations of the method 200 may be performed by the controller 11 of the machine tool 10 to automate presetting of the machine tool 10. In one embodiment, the controller 11 performs the operations of the method 200 and requests user participation at operations 212, 224, 258, and/or 260 which involve removing and installing the guide bushing 70 and connecting and disconnecting the probe 30. The remaining operations may be performed in an automated or autonomous manner without user intervention which improves the rapidity of presetting the machine tool 10. In some embodiments, the controller 11 may also perform operations 212, 224, 258, and/or 260 such as by coordinating the operation of a robotic arm to remove/install the guide bushing 70 and connect/disconnect the probe 30.

Figure 14:
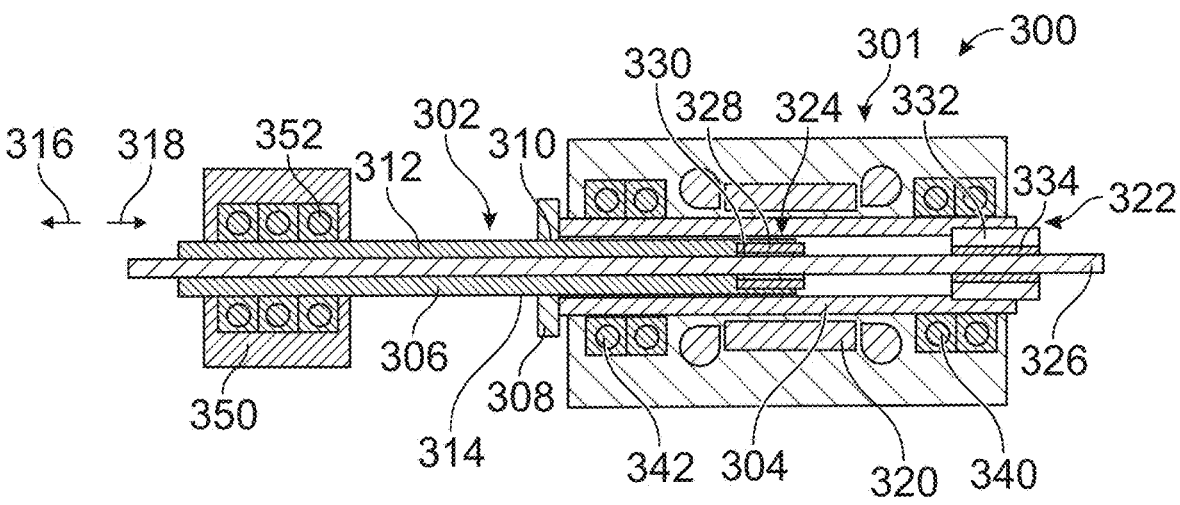
FIG. 14 is a schematic view of the first head of FIG. 6 showing a motor of the first head that directly turns the spindle shaft and indirectly turns the spline shaft by way of a spline adapter between the spindle shaft and the spline shaft.

Referring to FIG. 14, a head 300 is depicted that is similar in many respects to the first head 14 discussed above. The head 300 includes a spindle assembly 302 including a spindle shaft 304 and a spline shaft 306. The spindle assembly 302 includes a spline adapter 308 fixed to the spindle shaft 304 such as by fasteners. The spline adapter 308 has an opening 314 through which the spline shaft 306 extends. The spline adapter 308 has female splines 310 that engage male splines 312 of the spline shaft 306. The engagement between the female splines 310 and the male splines 312 permits the spline shaft 306 to shift axially relative to the spindle shaft 304 in an axially inward, retracting direction 316 and in an axially outward, extending direction 318. The engagement between the female splines 310 and male splines 312 inhibits relative rotary movement of the spline shaft 306 and the adapter 308. The head 300 has a drive 301 including a motor 320 connected to the spindle shaft 304 such as by having a rotor of the motor 320 shrink-fit onto the spindle shaft 304. The motor 320 turns the spindle shaft 304 which in turn, turns the spline shaft 306 via the spline adapter 308.

The head 300 includes a guide bushing 322 similar to the guide bushing 70 discussed above that is mounted to the spindle shaft 304 and rotates therewith. The guide bushing 70 cooperates with a collet assembly 324 to support a workpiece 326. The collet assembly 324 has a collet adapter 328 that engages an inner surface of the spline shaft 306 and a collet 330 that engages the workpiece 326. The guide bushing 322 similarly includes a guide bushing adapter 332 and a work holder such as a guide collet 334. The collet 324 is fixed relative to the workpiece 326 in axial and rotary directions whereas the guide collet 334 permits axial shifting of the workpiece 326 relative to the guide bushing 322. The head 300 includes bearings 340, 342 that support the spindle shaft 304 and a support assembly 350 that is axially shiftable in directions 316, 318 to shift the spline shaft 306 and workpiece 326 secured thereto in axial directions 316, 318. The support assembly 350 has bearings 352 to permit rotation of the spline shaft 306.

Figure 15:
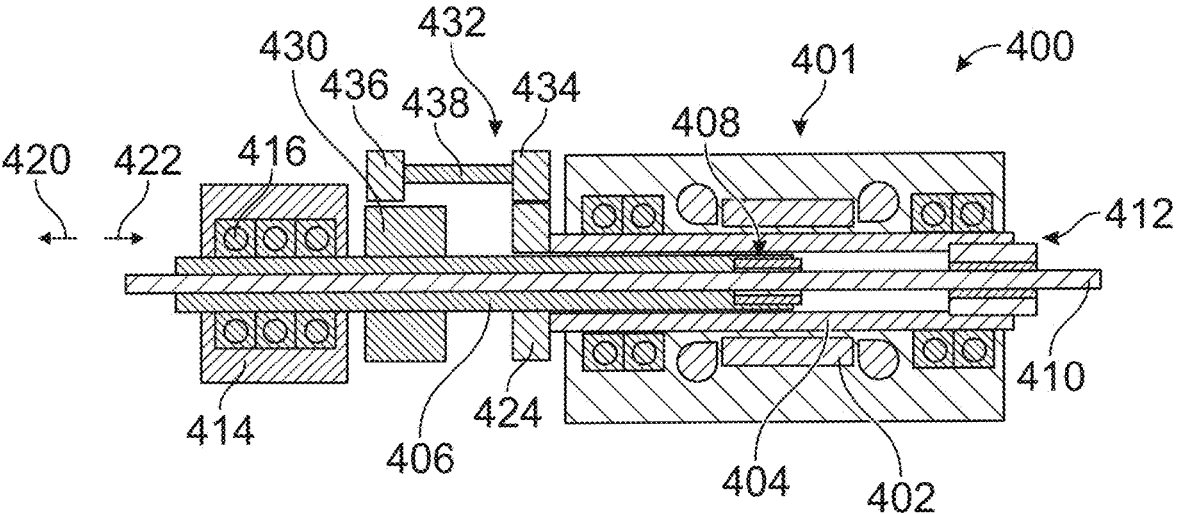
FIG. 15 is a schematic view of another head for a Swiss-type machine tool having a first gear connection between a spindle shaft and a sleeve of the head to transfer turning of the spindle shaft into turning of the sleeve.

Referring to FIG. 15, a head 400 is depicted that is similar in many respects to the head 300 discussed above such that differences will be highlighted. The head 400 has a drive 401 including a motor 402, a spindle shaft 404, and a sleeve 406 that is axially shiftable relative to the spindle shaft 404. The motor 402 is operable to rotate the spindle shaft 404.

The sleeve 406 has a collet assembly 408 that engages a workpiece 410 and the spindle shaft 404 has a removable guide bushing 412 similar to the guide bushing 70 discussed above. The head 400 has a support assembly 414 with bearings 416 to rotatably support the sleeve 406. The support assembly 414 is axially shiftable to shift the sleeve 406 in axial directions 420, 422.

To transfer rotation of the spindle shaft 404 into rotation of the sleeve 406, the head 400 includes a drive spindle gear 424 mounted to the spindle shaft 404 for rotation therewith. The head 400 further includes a driven sleeve gear 430 mounted to the sleeve 406 and a middle or intermediate transmission gear assembly 432 that connects the spindle gear 424 and the sleeve gear 430. In one embodiment, the middle gear assembly 432 includes a first gear 434, a second gear 436, and a rotary gear shaft 438 having the gears 434, 436 mounted thereto so as to be interconnected for rotating together.

The motor 402 rotates the spindle shaft 404, which rotates the spindle gear 424 mounted thereto. Rotation of the spindle gear 424 causes rotation of the first gear 434, shaft 438, second gear 436, sleeve gear 430, and sleeve 406. The sleeve gear 430 and second gear 436 are configured to permit the axial movement of the sleeve gear 430 with the sleeve 406 in directions 402, 422 while maintaining engagement between the teeth of the gears 430, 436.

Figure 16:
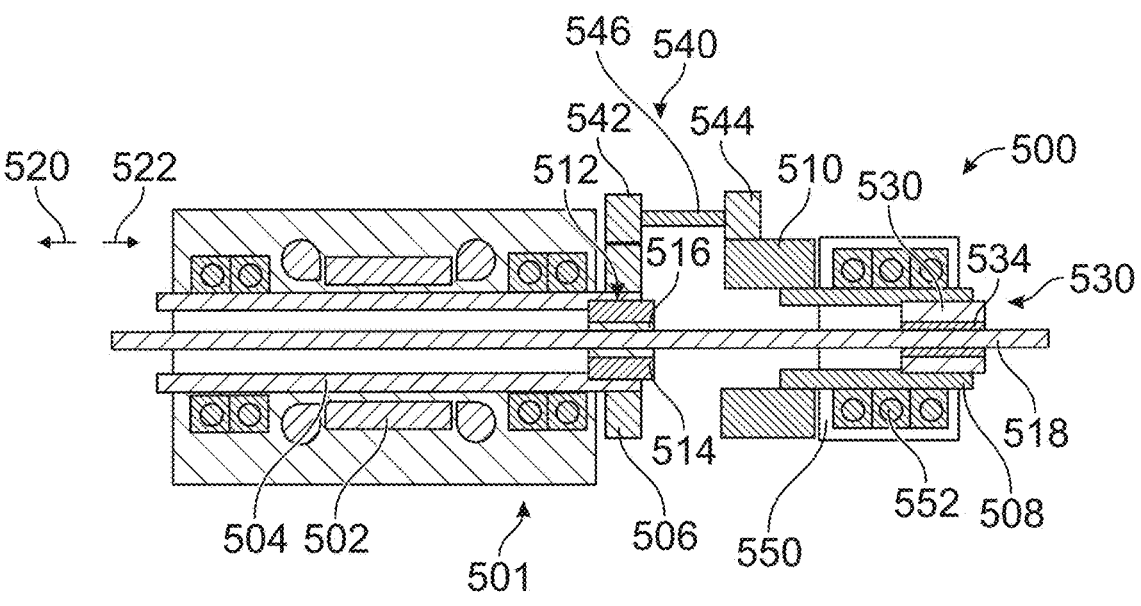
FIG. 16 is a schematic view of another head for a Swiss-type machine tool having a second gear connection between a spindle shaft and a sleeve of the head to transfer turning of the spindle shaft into turning of the sleeve.

Referring to FIG. 16, a head 500 is depicted that is similar to the head 400 discussed above such that differences will be highlighted. The head 500 has a drive 501 including a motor 502 that turns a spindle shaft 504 and a drive spindle gear 506 attached to the spindle shaft 504. The head 500 further includes a sleeve 508 having a driven sleeve gear 510 attached thereto. The spindle shaft 504 includes a collet assembly 512 having a collet adapter 514 and a collet 516. The collet 516 engages a workpiece 518 and fixes the workpiece 518 in the rotary and axial directions relative to the spindle shaft 504. The head 500 adjusts the axial position of the workpiece 518 by way of shifting the motor 502 and the spindle shaft 504 in axial directions 520, 522.

The head 500 includes the sleeve 508 with a guide bushing 530 similar to the guide bushing 70 discussed above. The guide bushing 530 includes a guide bushing adapter 532 and a guide collet 534. The guide bushing 530 permits the workpiece 518 to shift axially relative to the sleeve 508 while providing support for the workpiece.

To rotate the sleeve 508 with the spindle shaft 504, the head 500 includes a middle or intermediate transmission gear assembly 540 including a first gear 542 engaged with the spindle gear 506, a second gear 544 engaged with the sleeve gear 510, and a rotary gear shaft 546 connecting the first gear 542 and the second gear 544. In this manner, rotation of the spindle shaft 504 causes rotation of the spindle gear 506, the first gear 542, the shaft 546, the second gear 544, the sleeve gear 510, and the sleeve 508. The second gear 544 and the sleeve gear 510 are configured to permit axial movement of the second gear 544 relative to the sleeve gear 510 as the spindle shaft 504 is shifted in direction 520, 522. In FIG. 16, the support assembly 550 may be stationary and includes bearings 552 that permit rotation of the sleeve 508.

Figure 17:
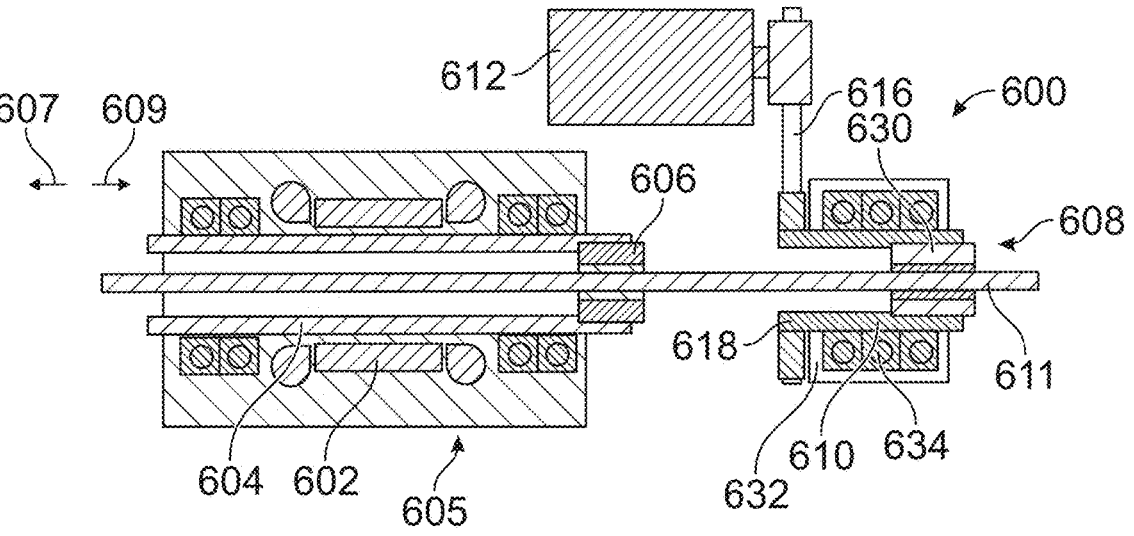
FIG. 17 is a schematic view of another head for a Swiss-type machine tool having a first motor to drive a spindle shaft of the head and a second motor to drive a sleeve of the head.

Referring to FIG. 17, a head 600 is depicted that is similar in many respects to the heads discussed above such that differences will be highlighted. The head 600 includes a spindle assembly 608 that includes a spindle shaft 604 and a sleeve 610. The head 600 has a drive 605 including a first motor 602 operable to rotate the spindle shaft 604 that includes a collet assembly 606. The collet assembly 606 fixes a workpiece 611 relative to the spindle shaft 604. The motor 602 and spindle shaft 604 are axially shiftable in axial directions 607, 609 to adjust the axial position of the workpiece 611.

The drive 605 of the head 600 includes a second motor 612 with a drive pulley 614 that drives a timing belt 616 engaged with a driven pulley 618. The pulley 618 is attached to the sleeve 610. Thus, the second motor 612 rotates the sleeve 610 while the first motor 602 rotates the spindle shaft 604. The first and second motors 602, 614 may be operated at the same or different speeds as required for a particular application.

The sleeve 610 supports a guide bushing 630 that is similar to the guide bushing 70 discussed above. The guide bushing 630 permits a workpiece 608 to shift axially relative to the sleeve 610. The head 600 has a support assembly 632 that remains stationary and includes bearings 634 that rotatably support the sleeve 610.

Figure 18:
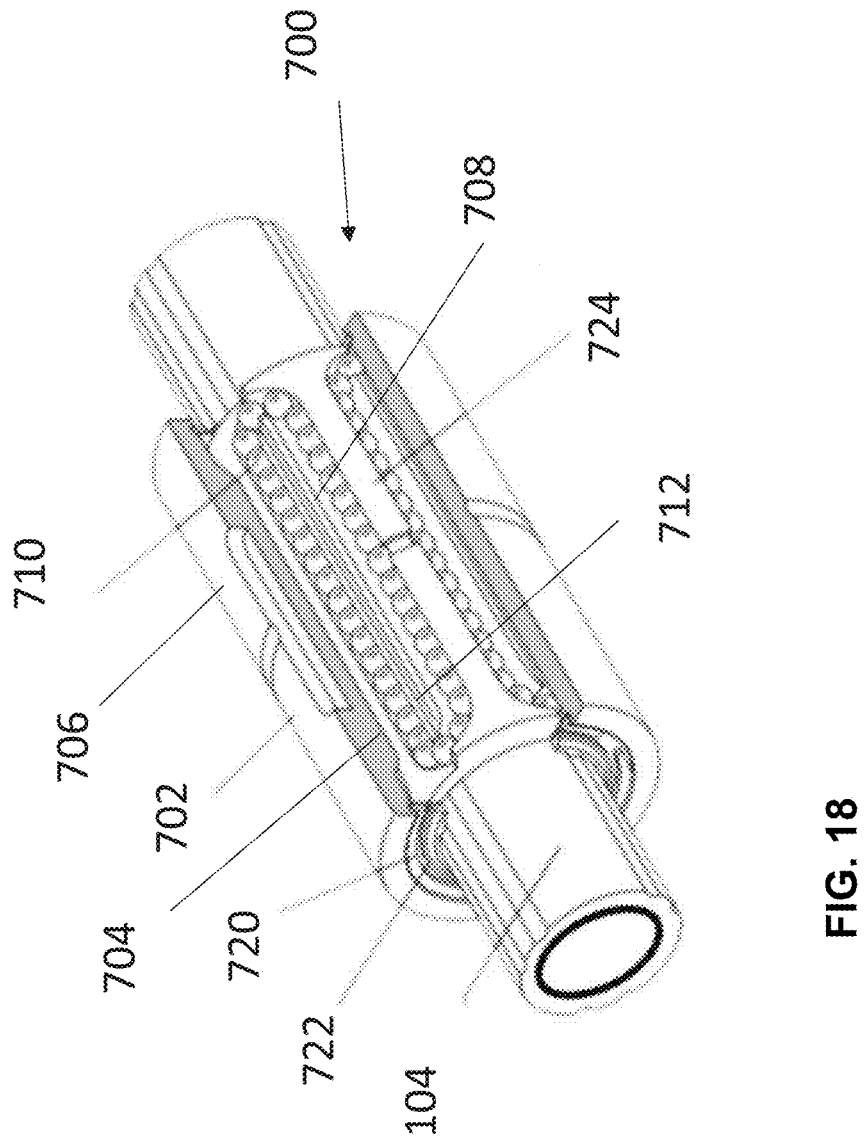
FIG. 18 is a perspective view of a ball spline connection with a portion of the connection removed to show a spline nut, ball bearings, and a spline shaft of the ball spline connection.

With reference to FIGS. 6 and 18, the slide connection 130 between the spindle shaft 102 and the spline shaft 104 may have a variety of configurations. In one embodiment, the slide connection 130 includes a ball spline connection 700 including the spline shaft 104 and a spline nut 702 of the spindle shaft 102. For example, the spline nut 702 may be mounted to a tubular member of the spindle shaft 102.

The spline nut 702 includes splines 704 extending radially inward from an outer wall portion 706 of the spline nut 702. The spline shaft 104 has splines 708 extending radially outward. The ball spline connection 700 has a plurality of roller elements such as ball bearings 710 received in pockets 712 formed between the spindle shaft 102 and the spline nut 702. The ball bearings 710 may roll within the pockets 712 to permit the spindle shaft 102 and the spline shaft 104 to shift axially relative to one another.

The spline nut 702 applies a compressive force radially inward against the ball bearings 710. In one approach, the spline nut 702 is heated to expand the spline nut 702, then permitted to cool once assembled with the spline shaft 104 and ball bearings 710. The inner diameter of the spline shaft 104 slightly constricts, such as by a few microns, which applies the compressive force against the ball bearings 710.

The tight engagement between the spline shaft 104, ball bearings 710, and spline nut 702 rigidly secures the spline shaft 104 and spline nut 702 against rotation relative to one another. The secure connection permits the ball spline connection 700 to transfer turning of the spindle shaft 102 to the spline shaft 104 without backlash. Despite being firmly engaged with the spline shaft 104 and the spline nut 702, the ball bearings 710 are able to roll along the surfaces of the pockets 712 to permit relative axial movement of the spline shaft 104 and spline nut 702. By eliminating backlash, the ball spline connection 700 allows for highly accurate rotary positions of the workpiece, secured to the spline shaft 104, to be determined.

In some embodiments, the ball spline connection 700 includes a snap ring 720, a seal 722, and a spacer such as a retainer 724. The retainer 724 limits contact between the ball bearings 710.

Figure 19:
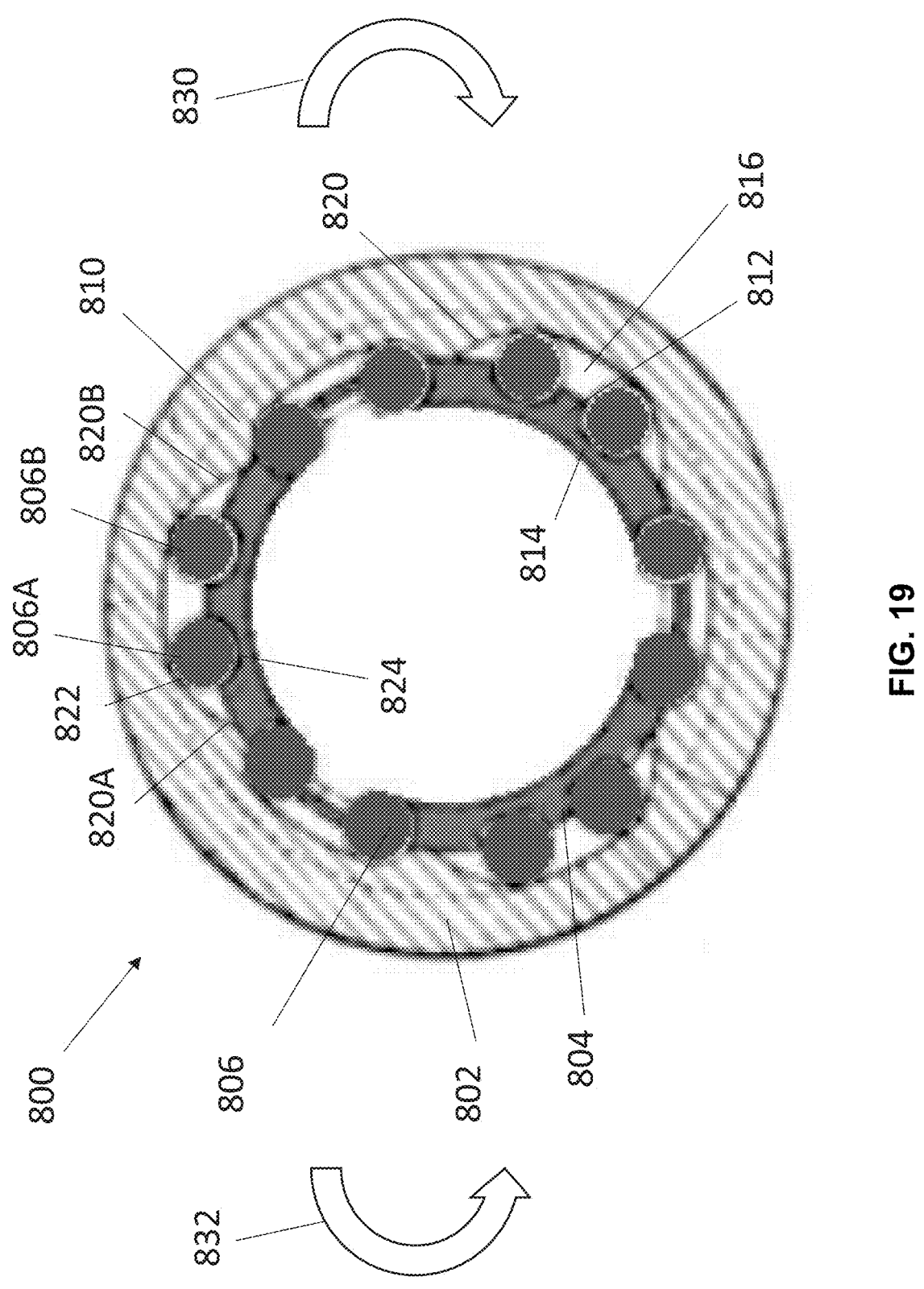
FIG. 19 is a cross-sectional view of a ball spline connection including a spline nut, a spline shaft, and ball bearings engaged with side surface portions of splines of the spline nut and the spline shaft.

Referring to FIG. 19, a cross-section of a ball spline connection 800 is illustrated that is similar in many respects to the ball spline connection 700 discussed above and may be utilized with the machine tool 10 or another machine tool disclosed herein. The ball spline connection 800 includes a spline nut 802, a spline shaft 804, and ball bearings 806. The spline nut 802 has splines 810 and the spline shaft 804 has splines 812 such as lands between recesses 814 of the spline shaft 804. The spline nut 802 and spline shaft 804 define pockets 816 in which the ball bearings 806 roll upon relative axial movement of the spline nut 802 and the spline shaft 804.

The splines 810 of the spline nut 802 have tapered side surface portions 820 such as side surface portions 820A, 820B and the splines 812 of the spline shaft 804 have surface portions 824. The ball bearings 806 have outer surfaces 822 that roll along the side surface portions 820A, 820B and surface portions 820 with relative axial movement of the spline shaft 804 and the spline nut 802.

Upon the spline nut 802 turning in direction 830, the tapered side surface portion 820A engages the outer surface 822 of ball bearing 806A. The tapered side surface portion 820A cammingly urges the ball bearing 806A radially inward into tighter engagement with the spline shaft 804. The ball bearing 806A rigidly resists the camming action and urges the spline shaft 804 to turn in direction 830 with the spline nut 802. Conversely, turning the spline nut 802 in direction 832 causes the tapered side surface 820B to engage the ball bearing 806B and cammingly urge the ball bearing 806B radially inwardly into tighter engagement with the spline shaft 804. The ball bearing 806B rigidly resists camming action and urges the spine shaft 804 to turn in direction 832 with the spline nut 802.

Figure 20A:
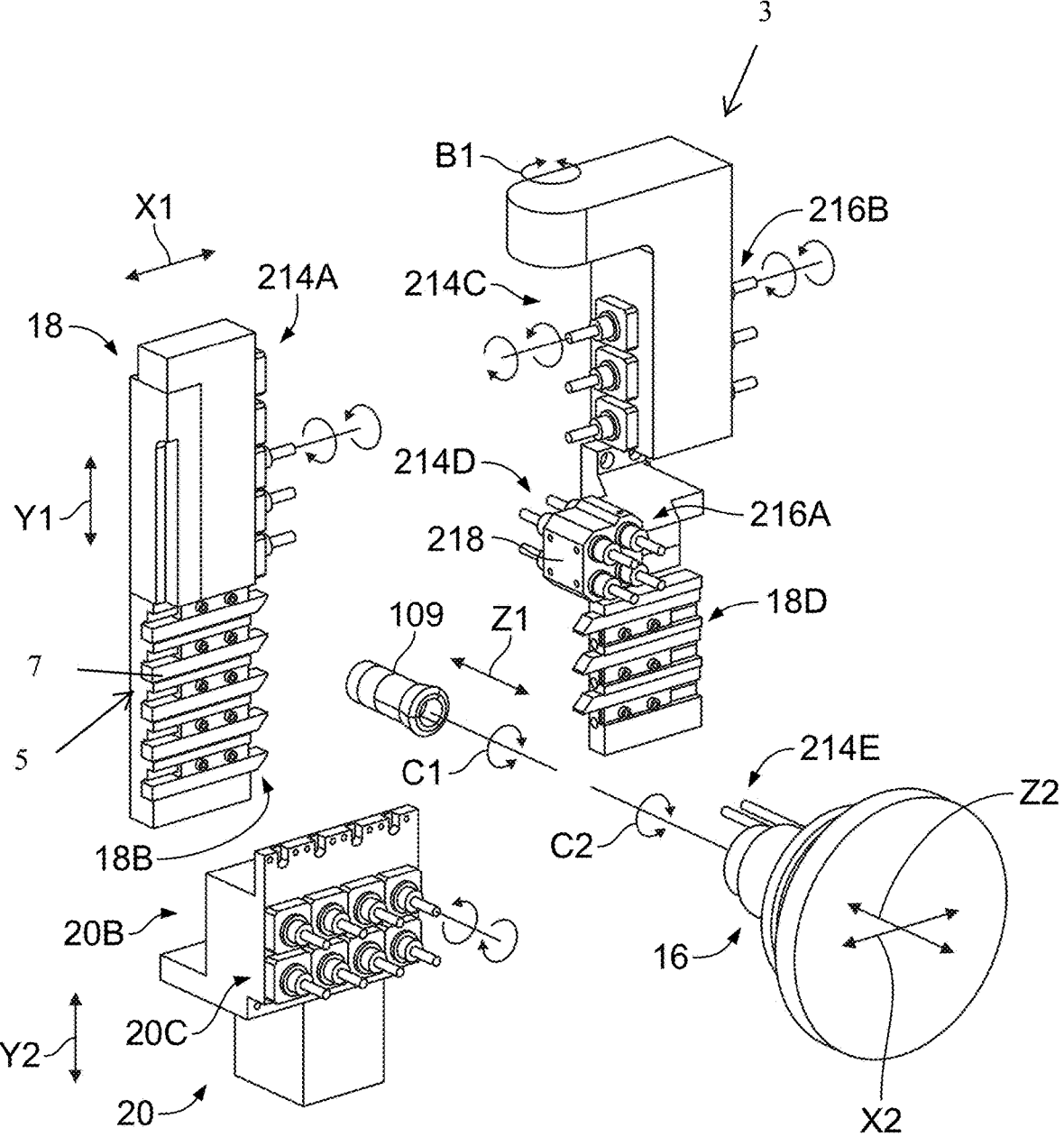
FIG. 20A is a perspective view of the collet of the first head, a workpiece holder of the second head, and first and second tool holder arrays of the machine tool of FIG. 1.

With reference to FIG. 20A, the collet 109 of the first head 14, the second head 16, first tool holder array 18, and second tool holder array 20 are shown. The first tool holder array 18 includes one or more tool holders for machining a workpiece held by the first head 14 and the second tool holder array 20 includes one or more tool holders that receive tools to machine a workpiece held by the second head 16. For example, the first tool holder array 18 includes tool holder assemblies 214A, 18B, 214C, 214D, 214E, and 18D with individual tool holders 5 that have tools 7 mounted thereto for machining a workpiece held by the first head 14. Each tool holder 5 receives a respective tool 7 and has a structure for securing the tool 7 in the tool holder 5. For example, the tool holders of the tool holder assemblies 18B, 18D each include a channel for receiving the respective tool and a locking member that is tightened down to fix the tool in the channel. As a further example, the tool holders of the tool holder assemblies 214A, 214C, 216B, 214D, 216A, and 214E may include a collet for securing the respective bit in the tool holder 5.

The tool holder 214E may be a component of the second head 16. The second tool holder array 20 includes tool holder assemblies 216A, 216B, and 20C for machining a workpiece held by the second head 52. As indicated in FIG. 20A, the first head 14, second head 16, and first and second tool holder arrays 18, 20 are operable to move the workpiece(s) and tools about axes X1, X2, Y1, Y2, Z1, Z2, and in directions B1, C1, C2. While the first head 14 is operable to rotate a workpiece in directions C1 about the Z1 axis and shift the workpiece along the Z1 axis, the second head 16 is operable to rotate a workpiece in directions C2 about the Z2 axis, shift the workpiece along the Z2 axis, and shift the workpiece along the X2 axis.

Figure 20B:
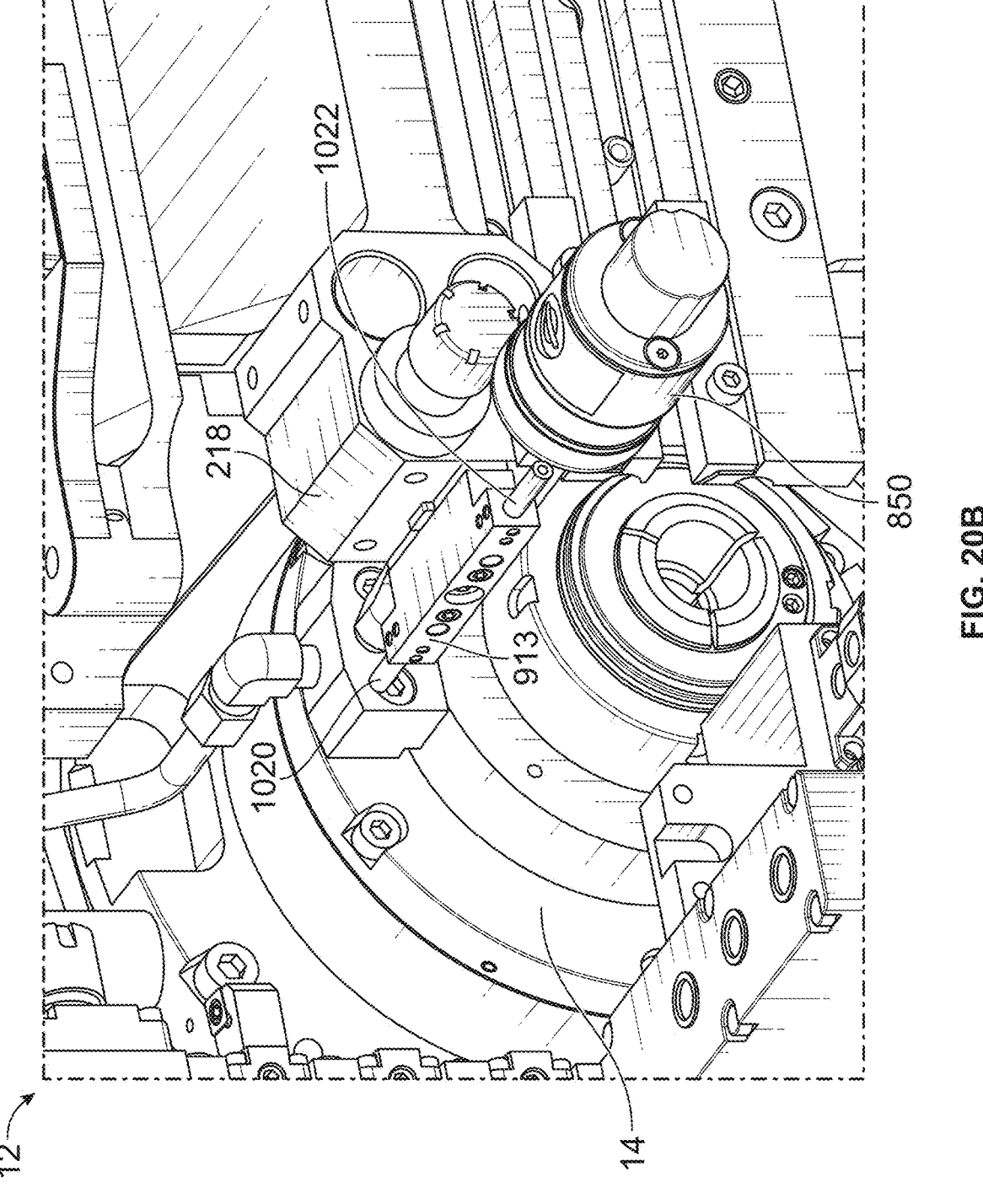
FIG. 20B is a view of a portion of an interior of the machining area of the machine tool of FIG. 1 showing an artifact used to calibrate the probes of the machine tool.

Regarding FIG. 20B, the machine tool 10 includes an artifact 913 in the machining area 12 that the machine tool 10 uses to calibrate the probes of the first and second heads 14, 16 during setup of the machine tool 10. The artifact 913 has calibration surfaces with known locations stored in the memory 15 of the machine tool 10 that provide a reference location for the controller 11 to utilize in calculating the location of the probes.

The probes may include a probe 850 of the second head 16 and a probe 907 (see FIG. 22) of the first head stock 14. The probes 907, 850 are similar to the probes 30, 32 discussed above. The second head 16 is not shown in FIG. 20B to provide an unobstructed view of the probe 850 and the artifact 913.

In the illustrated form, the artifact 913 is mounted to the tool holder array 18 and is movable along the X1 and Y1 axes. As one example, the artifact 913 (see FIG. 20B) may be mounted to a block body 218 (see FIGS. 20A and 20B) that supports the tool holders 214D, 216A. The controller 11 calibrates the probe 907 by operating an artifact actuator, such as tool holder actuator 18A, to move the artifact 913 or by operating a first head actuator such as second drive 111 to move the first head 14 and the probe 907 mounted thereto, or doing both, to move the probe 907 and artifact 913 into contact with one another. The calibrating process may be automated and includes determining a Z-position of the probe 907 as well as an axially extending centerline of the probe 907. The relative movement necessary to bring the probe 907 and artifact 913 into contact with each other may be generated by shifting the artifact 913 along the X1 and/or Y1 axes and the probe 907 along the Z1 axis.

Once the probe 907 has been calibrated, the controller 11 is operable to cause the artifact 913 to be moved out of the way and to then cause relative movement of the first head 14 and the tool holder actuator 18A to bring the tools of the tool holder array 18 into contact with a tip 911 of the probe 907. The tip 911 in one embodiment has a polygonal cross-sectional configuration such as the illustrated cubic configuration (see side view of tip 911 in FIG. 22 and elevational view of tip 911 in FIG. 25B). When the probe tip 911 contacts one of the tools 7, the probe 907 transmits a radio frequency signal and emits an audible indication, e.g. a beep. The controller 11 receives the radio frequency signal via the communication circuitry 19 and uses the change in position of the tool holders 5 relative to the probe 907, as well as data from the calibration of the probe 907, to determine a tool offset value for the tools, such as X, Y, and/or Z offset values of each tool relative to the X1, Y1, and Z1 axes. Thus, with the above-described automated calibration procedures, the controller 11 is able to quickly learn the precise distances in the different orthogonal axes between the tools 7 and the workpiece held in the heads to allow for accurate machining thereof.

In one embodiment, the tool offset values of the machine tool 10 include the distance a tip of a turning tool is spaced from the tool holder in which the turning tool is held. For example and with reference to FIG. 21, the tool offset values for tool 950 may include an X-axis offset value representative of the linear distance 971 of the space between a tip 973 of the tool 950 and a leading edge 975 of the tool holder block 18D. The leading edge 975 of the tool holder block 18D has a known position in the machining area 12. The tool offset values for the tool 950 may also include a Y-axis tool offset value that indicates the position of the tool tip 973 along the Y1 axis relative to, for example, the origin of the X1 and Y1 axes. The controller 11 may determine the Y-axis tool offset value in response to an operator using the user interface 13 to input the channel 956 of the tool holder block 18D in which the tool 950 is held. The tool offset values may also include a Z-axis offset value of a tool along the Z1 axis.

An operator may provide a user input associated with a tool offset value to the user interface 13. In one embodiment, the user input may include a Z-shift distance for one or more tools of the machine tool 10. For example, if the master tool is a left-handed tool and a second tool is a right-handed tool, the operator can provide a Z-shift distance for the second right-handed tool relative to the left-handed master tool. In this manner, the controller 11 will expect the probe tip 973 to contact the right-handed tool in a different position along the Z1 axis than the left-handed master tool.

Figure 20C:
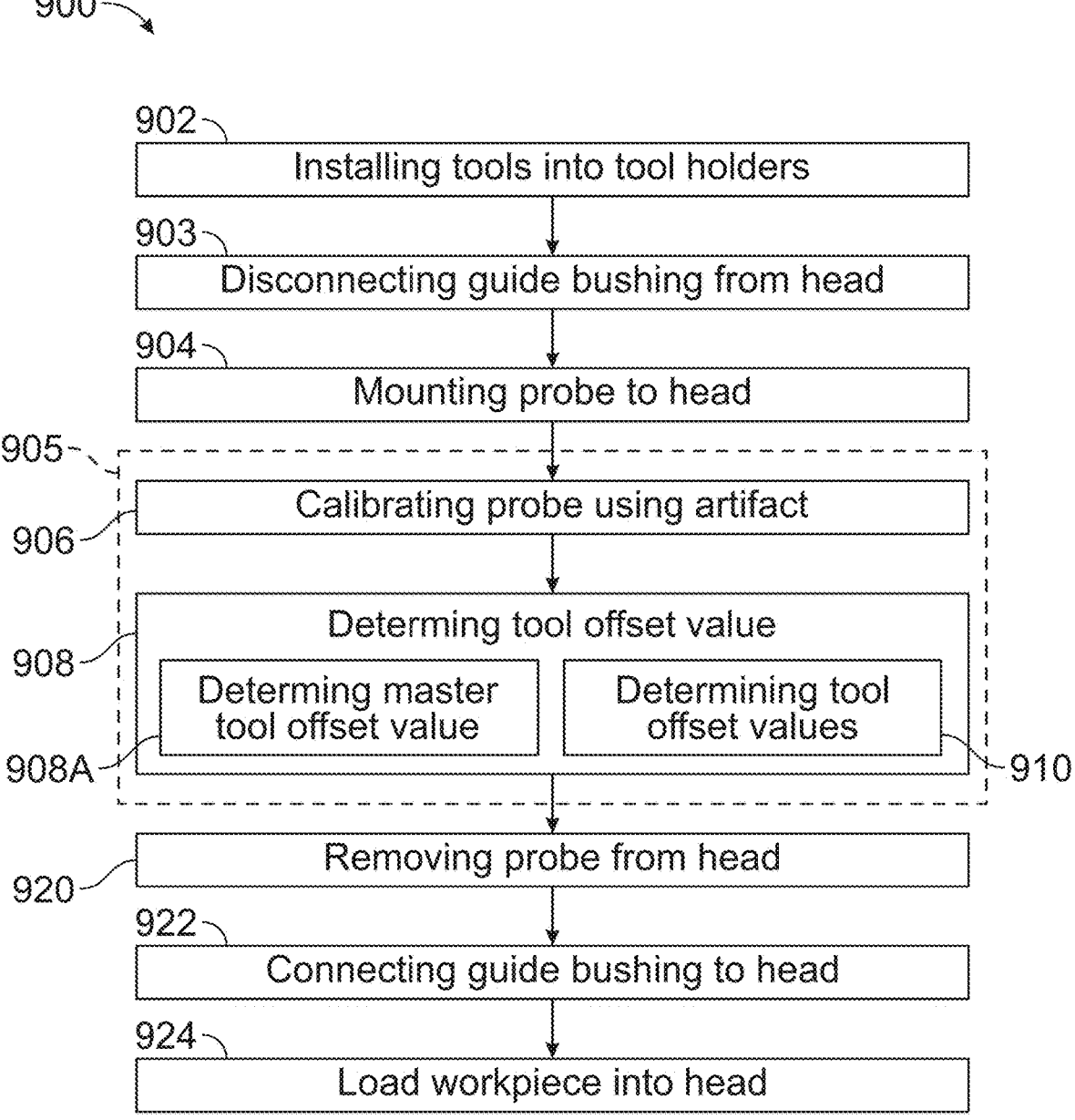
FIG. 20C is a flow diagram of a method of setting up the machine tool of FIG. 1 including calibrating a probe using the artifact of FIG. 20B.

With reference to FIG. 20C, a method 900 is provided for setting up the machine tool 10 that automates many aspects of this process. The controller 11 is operable to either prompt or perform the steps of the method 900, including prompting specific activities by the operator (e.g., operations 902, 903, 904, 920, 922, and 924) and autonomously performing probe calibration and tool setup operations 905 including operations 908, 908A. The following discussion describes the method 900 with respect to the first head 14 and probe 907, but it will be appreciated that the method 900 may be performed with both the first head 14, the second head 16, the probe 907, and the probe 850. Alternatively, the method 900 may be performed with respect to the first head 14 and the probe 907, then performed again with respect to the second head 16 and the probe 907 after transferring the probe 907 from the first head 14 to the second head 16.

Figure 21:
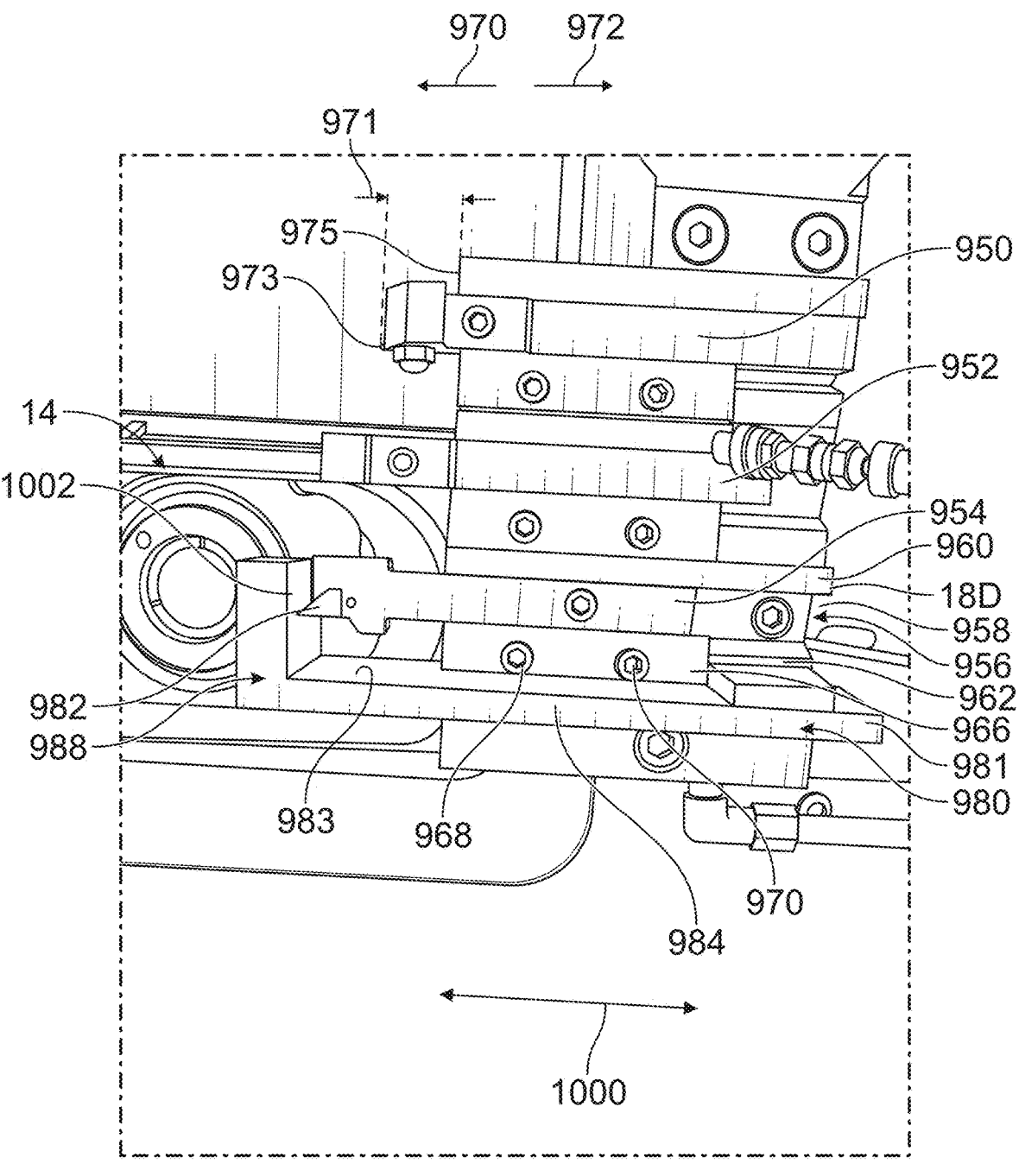
FIG. 21 is an elevational view of one of the tool holders of FIG. 20A and a tool setting jig mounted on the tool holder for positioning a tool in the tool holder.

The method 900 includes a tool installing operation 902 in which a machine tool operator installs one or more tools into the tool holders 7 of the first tool holder array 18 for machining a particular workpiece. With reference to FIGS. 20A and 21, the tool holder block 18D, is shown with tools 950, 952, 954 received therein. The tool holder block 18D is a block with tool holders that each include a slots or channel for receiving individual ones of the tools 950, 952, 954 therein. For example, the tool holder block 18D has a slot or channel 956 with a recess 958 and walls 960, 962 on opposite sides of the recess 958. The tool 954 is received in the channel 956 and the walls 960, 962 constrain the tool 954 to shifting along the X1 axis.

The tool holders 7 of the tool holder block 18D each include a clamp lock, such as a lockdown wedge bar 966, with one or more actuators such as set screws 968, 970 for shifting the lockdown wedge 966 from an open or unlocked position to a locked position. In the unlocked or open position, the wedge bar 966 is adjacent one of the channel walls 960, 962 and raised relative thereto which permits the tool 954 to be axially shifted along the channel 956 in directions 970, 972. In the locked configuration, the set screws 968 and 970 are turned in a tightening direction to drive the wedge bar 966 down into the channel 956 and clamp the tool 954 in the channel 956. In one approach, the wedge bar 966 wedges between the tool 954 and the wall 962 to tightly press the tool 954 against the wall 960 and fix the tool 954 against movement in the channel 956. In another approach, the clamp lock has a locking member that overlaps the tool 954 in a direction into the page in FIG. 21 such that tightening down the set screws 968, 970 causes the locking member to clamp a shank of the tool 954 between the locking member and a floor of the channel 956.

The tool installing operation 902 can include positioning the tool 954 in the channel 956 and positioning the tool 954 in the channel using a tool setting jig such as a touch off jig 980. The touch off jig 980 fits onto the tool holder block 18D and sets the tool 954 at a known position relative to the tool holder block 18D so that the controller 11 may cause the tool holder 18D to shift to bring a cutting tip 982 into contact with the cubic tip 911 of the probe 907 during the determining operation 908.

Referring to FIG. 21, the touch off jig 982 includes a first locator, such as a first jig locating portion 981, that extends around one side of the tool holder 18D, a second locator such as a second jig locating portion 983 that extends around an opposite side of the tool holder 18D, and an elongate connecting portion 984 extending across the front of the tool holder 18D. The first and second jig locating portions 981, 983 are separated by a distance 1000 that matches the width of the tool holder block 18D. Once the tool 954 is fixedly mounted to the tool holder 18D, the tool 954 has a tool locator portion 988 a fixed, predetermined distance from the leading edge 975 of the tool holder block 18D engaged by the second jig locating portion 983. As part of tool installing operation 902, the user shifts the tool 954 in axial direction 970 to abut the cutting tip 982 with a flat surface 1002 of the tool locator portion 988. The abutment of the cutting tip 982 and the tool locator portion 988 locates the cutting tip 982 at the fixed, predetermined distance from the side of the tool holder 18D engaged by the second jig locating portion 983. The user then tightens down the set screws 968, 970 to fix the tool 954 in position. Because the cutting tip 982 is installed at a predetermined position relative to the tool holder 18D via the touch off jig 980, the controller 11 may move the tool holder 18D during the determining operation 908 with an approximate tool offset that corresponds to the position of the tool 954 set by the touch off jig 980.

The method 900 includes a guide bushing removal step 903 where the guide bushing 70 is disconnected from the head 14 and a probe mounting step 904 where the probe 907 is mounted to the first head 14, such as using the operations discussed above with respect to FIGS. 9-11.

Once the tools have been installed in the tool holders and the probe 907 mounted to the first head 14, the machine tool operator provides a user input to the user interface 13 that provides an indication to the controller 11 that the machine tool 10 is ready to proceed with the automated machine tool setup. In this regard, the controller 11 may perform the probe calibration and tool setup operations 905 upon receiving the user input and without subsequent user involvement until the operation 905 is completed.

The probe calibration and tool setup operation step 905 includes a probe calibration operation 906 using the artifact 913. The probe 907 has an adapter 907A configured to be clamped in the collet 109. Once the adapter 907A is mounted to the collet 109, the controller 11 may have rough position data (e.g., Z-axis offset and centerline values) of the probe 907 based upon the make/model of the probe 907 and the adapter 907A. The probe calibrating operation 906 is performed to fine tune or determine with a high level of accuracy the positioning of the probe 907 in the machine tool 10. The calibrating operation 906 may compensate for dimensional variations and/or stack up in the assembly of the probe 907 and first head 14 as well as provide high accuracy knowledge of the position and orientation of the probe 907. The controller 11 subsequently uses the high accuracy position data of the probe 907 determined during the calibrating operation 906 operation for the determining operation 908 where tool offset values for tools of the machine tool 10 are determined, as discussed in greater detail below.

Figures 22, 23, 24:
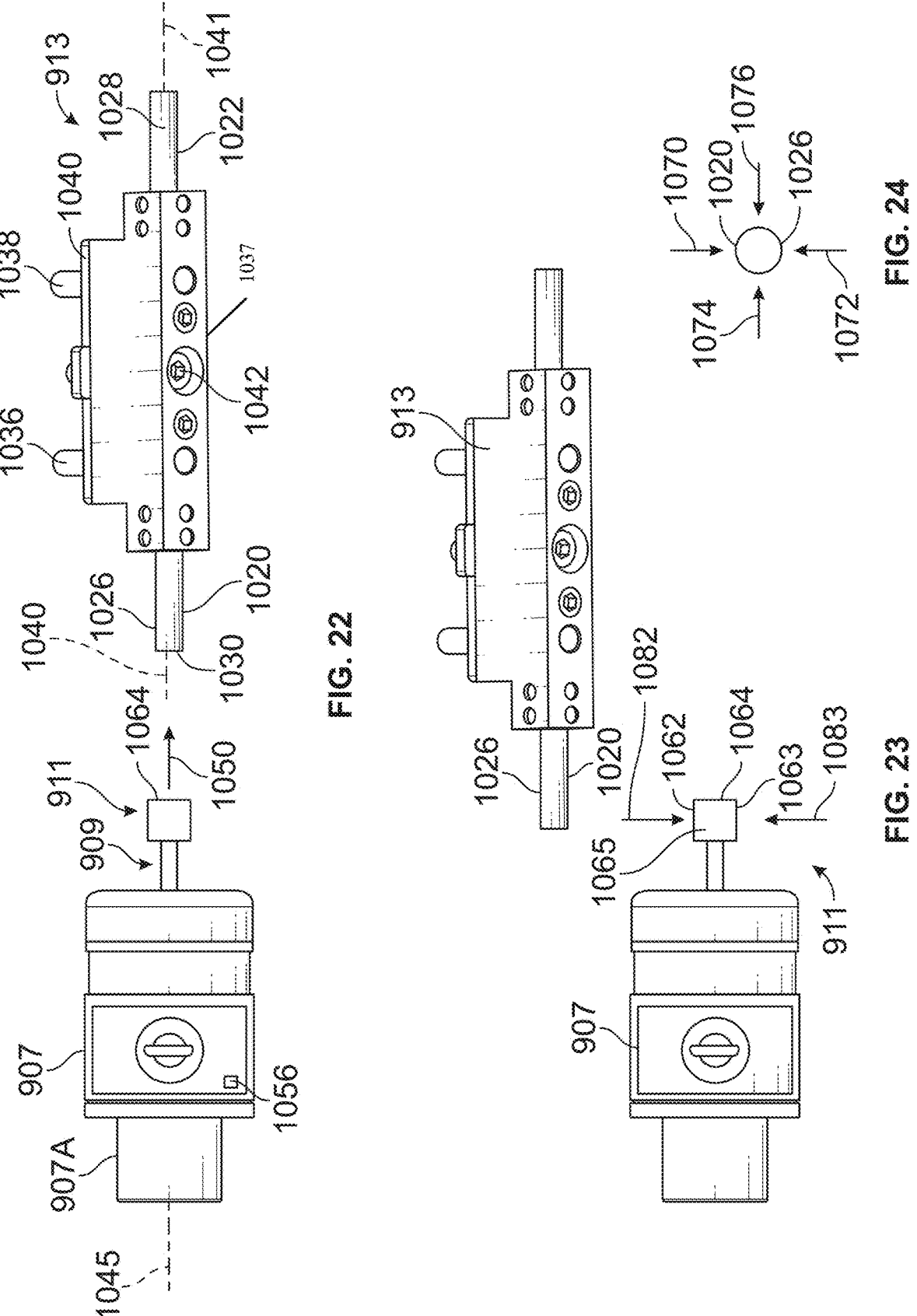
FIG. 22 is a schematic view of a probe of the first head being advanced into contact with an end surface of a precision pin of the artifact of FIG. 20B to determine a Z-position offset value of the probe.
FIG. 23 is a schematic view similar to FIG. 22 showing a cubic tip of the probe with flat side surfaces that are contacted by an outer surface of the artifact precision pin for determining a centerline of the probe.
FIG. 24 is an end view of the artifact precision pin showing the outer surface of the artifact precision pin as being circular so that the pin is cylindrical and schematically indicating that the flat side surfaces of the probe cubic tip can contact four quadrants of the cylindrical outer surface of the artifact precision pin.

With reference to FIG. 22, the probe 907 has a projecting stylus 909 including the cube tip 911 for being contacted by an artifact 913 of the machine tool 10, as discussed in greater detail below. The artifact 913 includes a main block body 1037, a first precision pin 1020 projecting from one end of the body 1037 for use with the first head 14 and a second precision pin 1022 projecting from the other end of the body 1037 for use with the second head 16. The precision pins 1020, 1022 have high-precision cylindrical outer surfaces 1026, 1028 and flat end surfaces 1030, 1032. The artifact 913 may include alignment members including pins 1036, 1038, an alignment shim 1040, and a mounting bolt 1042 for securing the artifact 913 to the block body 218, as can be seen in FIG. 20A. The artifact 913 is secured to the block body 218 which is installed in the machine tool 10 such that central axes 1020, 1021 of the first and second precision pins 1040, 1041 are parallel to the Z1 and Z2 axes of the first and second heads 14, 16.

In the calibrating operation 906, the controller 11 causes the second tool holder array 18 and artifact 913 mounted thereto to shift along the X1 and/or Y1 axes to bring the central axis 1040 of the first precision pin 1020 into coaxial alignment with the axis of rotation 15 of the first head 14. The spline shaft 104 is in a retracted position similar to the position of FIGS. 12 and 13 to position the cubic tip 911 out of the way of the artifact 913 as the artifact 913 is moved into the coaxial position shown in FIG. 22. Once the artifact 913 has been aligned with the probe 907 and the axis of rotation 15, the controller 11 operates the second drive 111 of the first head 14 so that the spline shaft 104 and the probe 907 are axially advanced in direction 1050 until a leading, flat surface 1064 of the cubic tip 911 contacts the flat end surface 1030 of the first precision pin 1020. Upon contact, the probe 907 transmits a radio frequency signal to the communication circuitry 19 of the machine tool 10 via a transmitter 1056 of the probe 907. The controller 11 determines the Z-position of the probe 907 based upon the known position of the artifact 913 and the change in Z position of the spline shaft 104.

In the calibrating operation 906, the controller 11 determines a centerline 1045 of the probe 907. In one approach, the controller 11 causes the artifact 913 to shift laterally out of coaxial alignment with the axis of rotation 15, then the controller 11 causes the spline shaft 104 to axially advance to shift the probe in direction 1050 until the cubic tip 911 overlaps the first precision pin 1020 in a radial direction. The controller 11 then moves the artifact 913 in direction 1082 until the cylindrical outer surface 1026 of the first precision pin 1020 contacts a flat side surface 1062 of the cubic tip 911. Upon contact, the probe 907 transmits a radio frequency signal that the controller 11 uses to determine the position of the flat side surface 1062.

With reference to FIG. 24, the movement of the artifact 913 in a downward radial direction 1082 causes the upwardly facing flat side surface 1062 of the cubic tip 911 to contact a first quadrant 1072 of the cylindrical outer surface 1026. The term quadrant is used to describe a quarter of the cylindrical outer surface 1026, such as the arcuate surface portion of the cylindrical outer surface 1026 that extends 90 degrees around the central axis 1040. In the calibrating operation 906, the controller 11 causes the artifact 913 to be repositioned in X1 and Y1 directions, i.e., along the X1 and Y1 axes, about the cubic tip 911 to be located radially outward from a different one of the flat sides of the cubic tip 911 such as below flat side surface 1063. When the artifact 913 is positioned below the cubic tip 911, for example, the controller 11 will then causes the first precision pin 1020 to be moved upward in direction 1083 so that the downwardly facing flat side surface 1063 contacts a second quadrant 1072 of the cylindrical outer surface 1026. The controller 11 can cause the artifact 913 to be moved about the probe 907 to either side thereof for bringing the quadrants 1074, 1076 of the cubic tip 911 into contact with the other flat side surfaces 1065, 1067 (see FIG. 25B) of the probe 911. The controller 11 can then determine the precise location of the centerline of the probe 907 relative to the X1 and Y1 axes as being halfway between the flat side surfaces 1062, 1063 and halfway between the flat side surfaces 1065, 1067.

In one approach, the controller 11 determines a first reference centerline by causing the artifact 913 and the probe 907 to contact one another as described above, the probe 907 to be rotated 180 degrees, and then determines a second reference centerline by causing the artifact 913 and the rotated probe 907 to contact one another in the manner described above. The controller 11 can then determine the centerline of the probe 907 using the first and second reference centerlines, such as by averaging the location data of the first centerline and the second centerline.

Once the probe 907 has been calibrated via probe calibration operation 906, the controller 11 then proceeds to the tool offset value determination operation 908 where the controller determines one or more tool offset values for one or more tools. In one approach, the tool offset value determination operation 908 includes first determination operation 908A where a tool offset value of a master tool selected by the user is determined and a second determination operation 910 where one or more tool offset values for one or more tools are determined. The tool offset value(s) are determined for the master tool before the other tools.

The master tool may be a facing tool that is used to face the workpiece and the tool offset values include a Z-axis offset value for the master tool. The Z-axis offset value for the facing tool is determined to set the Z=0 position along the Z-axis (i.e., the axis of rotation 15) for the part to be machined from the workpiece. In one approach, face cutting or facing the end of the raw workpiece (e.g., bar stock) is performed prior to any other machining of the workpiece. By face cutting the raw workpiece, the machining process may start with a clean workpiece end face that is true to the X1 and Y1 axes of the machine tool 10. Because the location of the end face of the workpiece cut by the facing tool is now the Z=0 for the part to be machined, the machine tool 10 provides high accuracy of the tool offset values for the remaining tools by measuring the Z-axis tool offset values from the Z-axis position of the facing tool. The method 900 may include the master tool face cutting the workpiece, or the master tool may face cut the workpiece upon completion of the method 900.

Figure 25A:
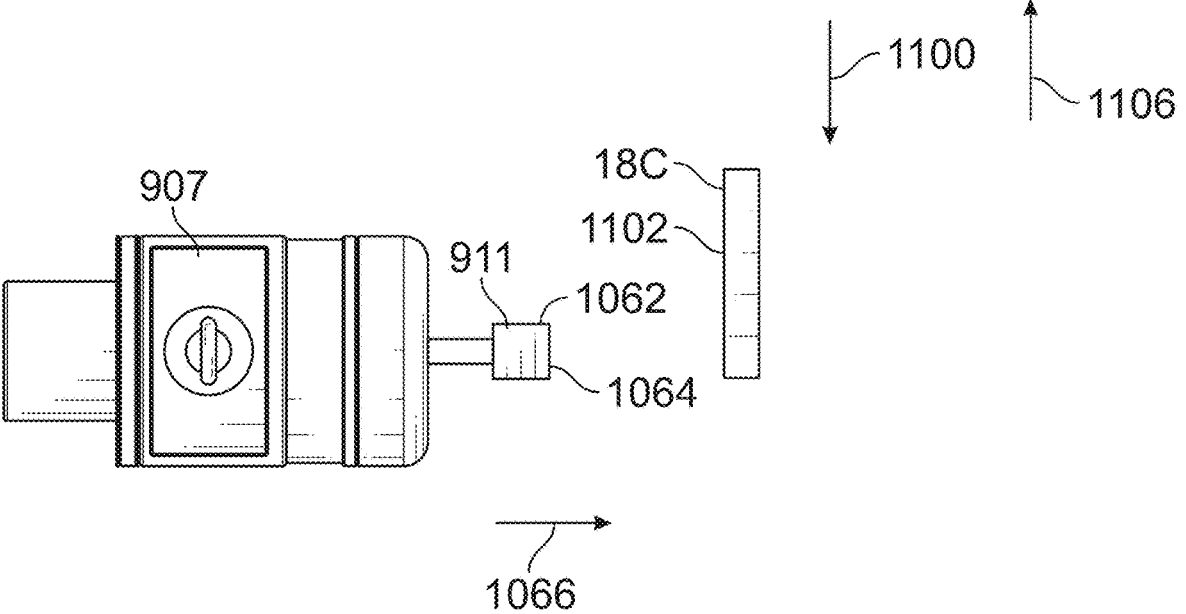
FIG. 25A is a schematic view of a probe of the first head being advanced into contact with a master tool to set a Z-axis tool offset value of the master tool.
Figure 25B:
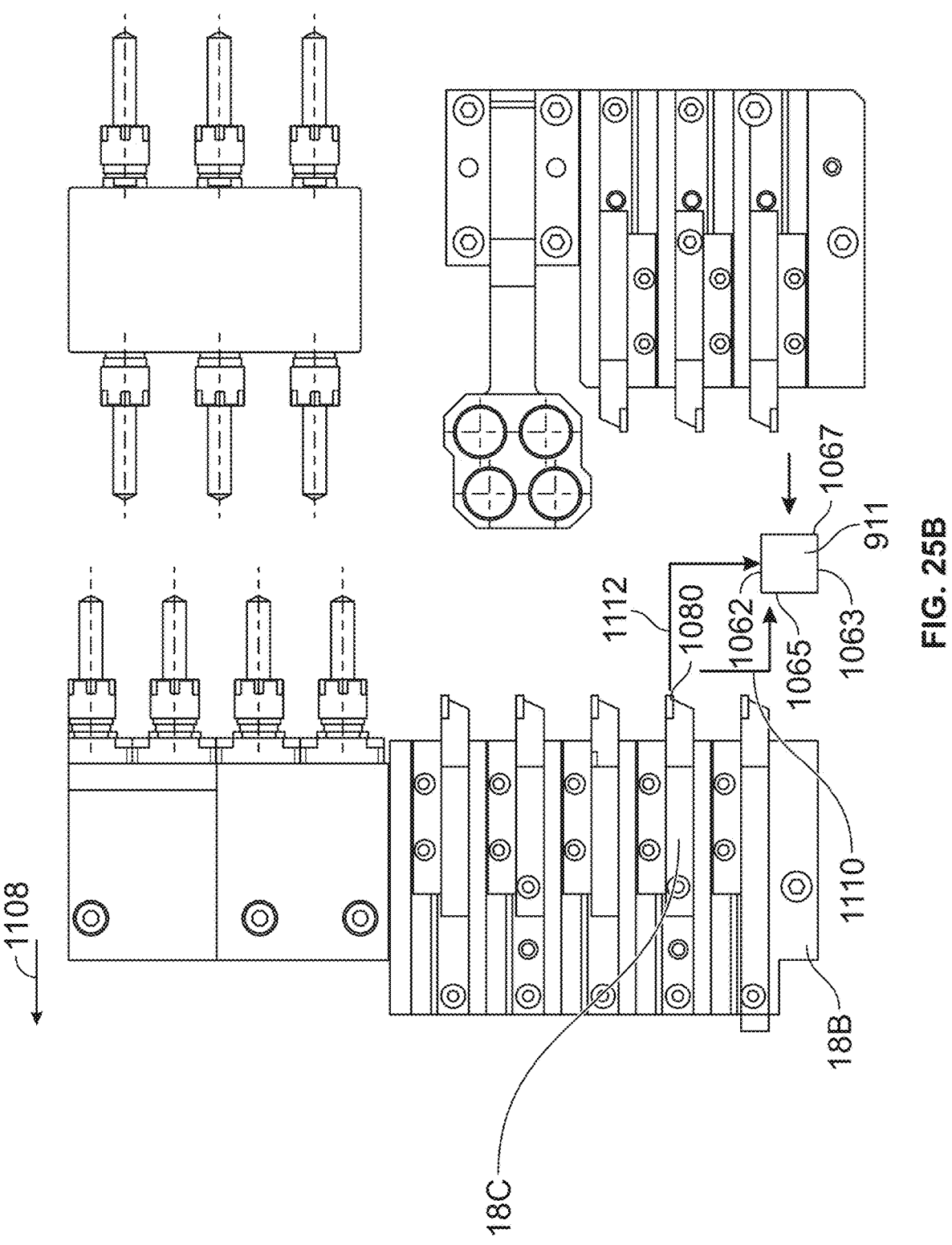
FIG. 25B is a schematic view of tools of the first tool holder array being advanced in X- and Y-axis directions to contact the cubic tip of the probe as part of the process of determining X- and Y-axis tool offset values for the tools.

More specifically and with reference to FIG. 25A, the operator has entered a user input to the machine tool 10 that the tool 18C is the master tool. As part of the determination operation 908A, the controller 11 causes the tool 18C to move in direction 1100 along the Y1 axis (see FIG. 20A) so that a surface 1102 of the tool 18C overlaps the flat leading surface 1064 of the cubic tip 911 along the central axis of rotation 15. The surface 1102 may be a surface of a cutting tip 1080 (see FIG. 25B) of the tool 18C, as one example. The controller 11 then causes the probe 907 to shift axially in direction 1166 until the flat leading surface 1064 of the cubic tip 911 of the probe 907 contacts the surface 1102 of the tool 18C. Upon such contact, the probe 907 transmits a radio frequency signal that is received by the controller 11 which it uses to determine the Z-axis offset of the tool 18C along the Z1 axis.

After determining the Z-axis master tool offset, the controller 11 then causes the probe 907 and/or the tool 18C to move to determine the X-axis offset of the tool 18C. For example, the controller 11 may cause the tool 18C to shift in direction 1106 (see FIG. 25A) along the Y1-axis and in direction 1108 (see FIG. 25B) along the X1 axis to move the tool 18C out of the way of the cubic tip 911. The controller 11 then causes the probe 907 to shift farther in direction 1066 along the Z1 axis to vertically align the cutting tip 1080 of the tool 18C with the cubic tip 911 of the probe 907. Next, the controller 11 causes the tool 18C to shift downward and over along path 1110 until the cutting tip 1080 contacts the flat side surface 1062 of the cubic tip 911. Upon contact, the probe 907 transmits a radio frequency signal that is received by the controller and which it uses to determine the tool offset value of the tool 18C along the X1 axis. In some approaches, the determining operation 908A may also include moving the tool 18C along path 1112 to contact the cutting tip 1080 with the upper flat side surface 1062 of the cubic probe 911 to determine the tool offset value of the tool 18C along the Y1 axis.

Once the controller 11 has determined the one or more tool offset values of the master tool, the controller 11 undertakes the tool offset value determining step 910 for determining one or more tool offset values for one or more tools. The determining step 910 involves the controller 11 causing the probe 907 and/or tools to move so that the probe 907 is brought into contact with each of the tools in a manner similar to the technique discussed above for the master tool 18C. The controller 11 then calculates tool offset values for the tools using the tool offset values of the master tool 18C as determined in operation 908A and the distance traveled by the probe 907 and/or tools along the X1, Y1, and/or Z1 axes.

With reference to FIG. 20A, in one approach the controller 11 causes the probe 907 and tool holder array 18 to move so that the probe 907 and the tools are brought into contact with each other as part of determining X-axis and Z-axis tool offset values for the tools of tool holder assemblies 18B, 18D; X-axis tool offset values for the tools of tool holder assembly 214A; Z-axis tool offset values for the tools of tool holder assembly 214E; X-axis and Z-axis tool offset values for the tools of tool holder assembly 214D; and Z-axis tool offset values for the tools of tool holder assembly 214C.

The controller 11 autonomously determines and stores in the memory 15 the locations of the tools in the machine tool 10 via the probe calibration step 906 using the artifact 913 and the tool offset value determination operation 908 using the calibrated probe 907. Next, the controller 11 may prompt the user (e.g., via a graphical user interface displayed by the user interface 13) to remove 920 the probe 907 from the first head 14 and connect 922 the guide bushing 70. Once the guide bushing 70 has been installed, the controller 11 may prompt the user to load 924 the workpiece into the first head 14. Prior to, during, or after the method 900, the user provides information to the controller 11 regarding the workpiece such as outer diameter so that the controller 11 may use the tool offset information and the workpiece outer diameter to advance the tools into contact with the workpiece.

If the second head 16 is to be used to machine a workpiece, the probe 907 is then installed in the second head 16 and the method 900 includes calibrating the probe 907 using the second precision pin 1022 of the artifact 913 in a manner similar to the calibrating 906 discussed above with respect to the probe 907 and the first head 14. The method further includes determining 908 tool offset values for the tools associated with the second head, such as the tools of tool holders 216A, 216B, 20B, in a manner similar to the determining 908 discussed above with respect to the tools of the first head 14. In some situations, the method 900 may include only performing the operations of method 900 with respect to the second head 16 if the first head 14 and tools thereof are not going to be used.

With reference to FIGS. 26A-26D, an adjustable touch off jig 1200 is shown that is similar in many respects to the touch off jig 980 discussed above. The touch off jig 1200 has a body 1202 with a first jig locating portion 1206. The touch off jig 1200 further includes a second jig locating portion 1208, a tool locator portion 1204, and an elongate connecting portion 1210. The touch off jig 1200 is adjustable to be mounted onto tool holder blocks of varying widths, such as different tool holder blocks of the same machine or tool holder blocks of different machines. The touch off jig 1200 is also adjustable to accommodate differently sized tools received in a given tool holder.

The touch off jig 1200 includes a first slide connection 1212 between the tool locator portion 1204 and the body 1202 and a second slide connection 1214 between the second jig locating portion 1208 and the body 1202. The first and second slide connections 1212, 1214 permit the tool locator portion 1204 and the second jig locating portion 1208 to be shifted independently relative to the body 1202. In one embodiment, the slide connections 1212, 1214 include a channel 1216, an elongate portion 1220 of the tool locator portion 1204 in the channel 1216, and an elongate portion 1224 of the second jig locating portion 1208 in the channel 1216. The touch off jig 1200 includes a lock for fixing the tool locator portion 1204 and the second jig locating portion 1208 relative to the body 1202. In one embodiment, the lock includes set screws 1230 of the tool locator portion 1204 and set screws 1232 of the second jig locating portion 1208.

Figure 26A:
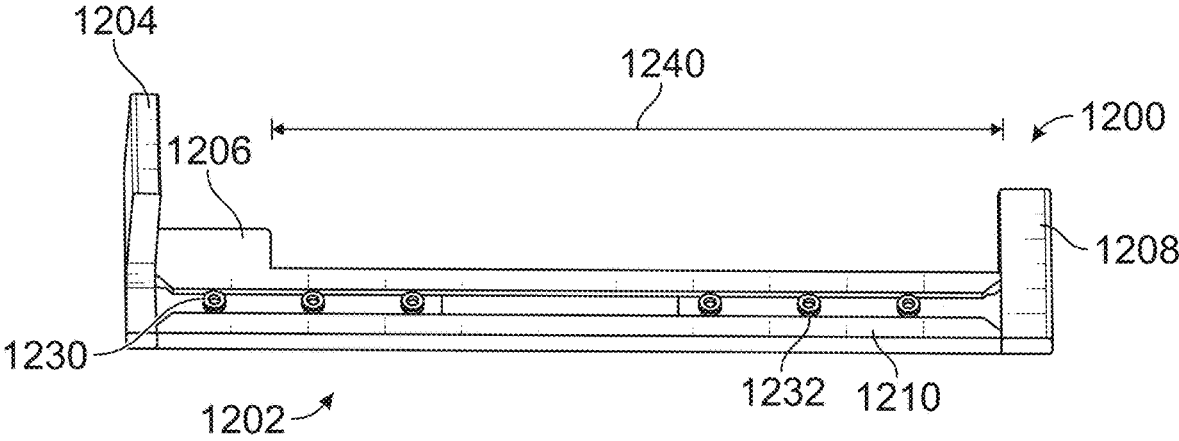
FIGS. 26A-26D are schematic views of an adjustable tool setting jig in different configurations to accommodate differently sized tool holder blocks and differently sized tools.

With reference to FIG. 26A, the tool locator portion 1204 and second jig locating portion are shown in retracted positions such that there is a first distance 1240 between the first jig locating portion 1206 and the second jig locating portion 1208. The first distance 1240 may be sized to permit the tool locator portions 1206, 1208 to be positioned on opposite sides of a standard tool holder block.

Figure 26B:
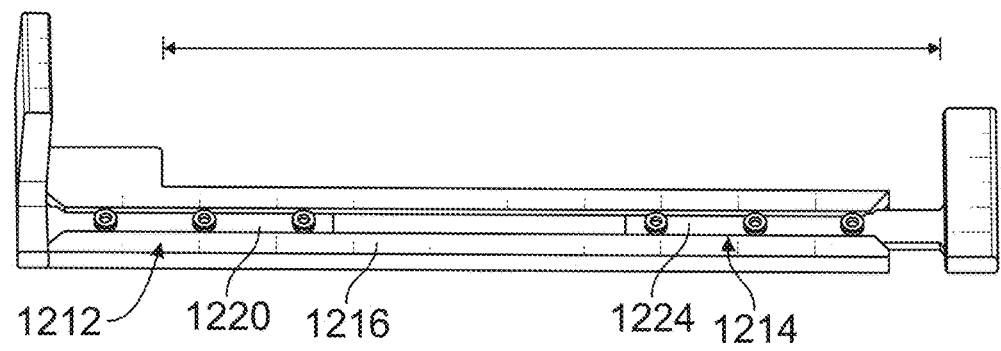

In FIG. 26B, the set screws 1232 have been loosened, the second jig locating portion 1208 shifted away from the first jig locating portion 1206, and the set screws 1232 tightened down. In the configuration of FIG. 26B, the first jig locating portion 1206 and second jig locating portion 1208 have a second distance 1242 that is longer than the first distance 1240. The touch off jig 1200 may thereby be mounted to a wider tool holder block in the configuration of FIG. 26B than in the configuration of FIG. 26A.

Figure 26C:
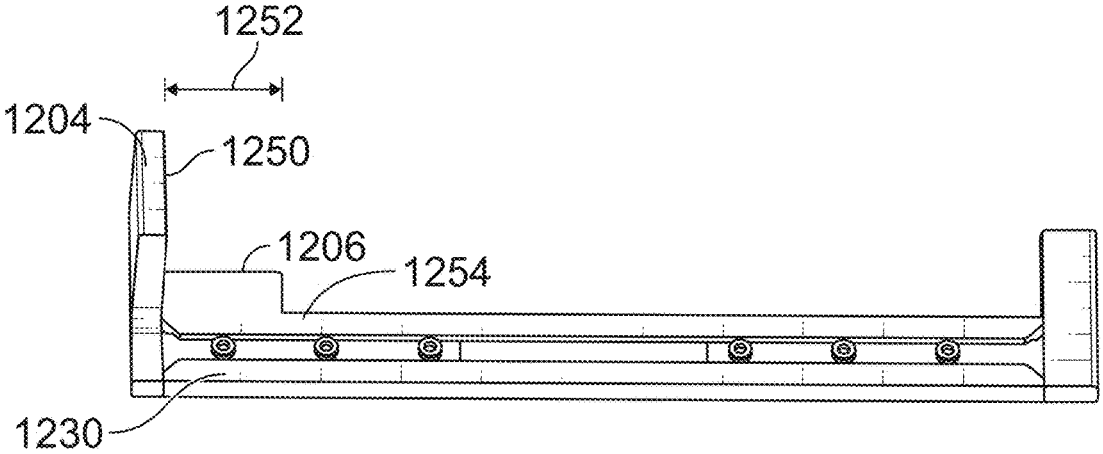

With reference to FIG. 26C, the touch off jig 1200 is shown in the same configuration as FIG. 26A with the tool contacting portion 1204 and the second jig locating portion 1208 retracted relative to the body 1202. The tool contacting portion 1204 has a tool contacting surface 1250 a longitudinal distance 1252 from a tool holder block contacting surface 1254. Once the touch off jig 1200 has been mounted to a tool holder block, the user may shift a tool in the tool holder block to contact a tip of the tool with the tool contacting portion 1204. The touch off jig 1200 is configured such that the tip of the tool contacting the tool contacting portion 1204 will be the distance 1252 from the side of the tool holder block, due to the distance 1252 between the surfaces 1250, 1254. In this manner, if the user installs the tools in a tool holder block using the touch off jig 1200, the tools will have a rough position expected by the controller 11 as the controller 11 moves the probe 907 into contact with the tool. The touch off jig 1200 thereby facilitates accurate and efficient determination of tool offset values by positioning the tools in a tool holder in predetermined positions. The controller 11 may alert the user if a tool is incorrectly installed, such as if the probe 907 contacts the tool before the controller 11 expected to (e.g., the tool tip was too far outward from the tool holder block) or after the controller 11 expected to (e.g., the tool tip was too far inward in the tool holder block).

Figure 26D:
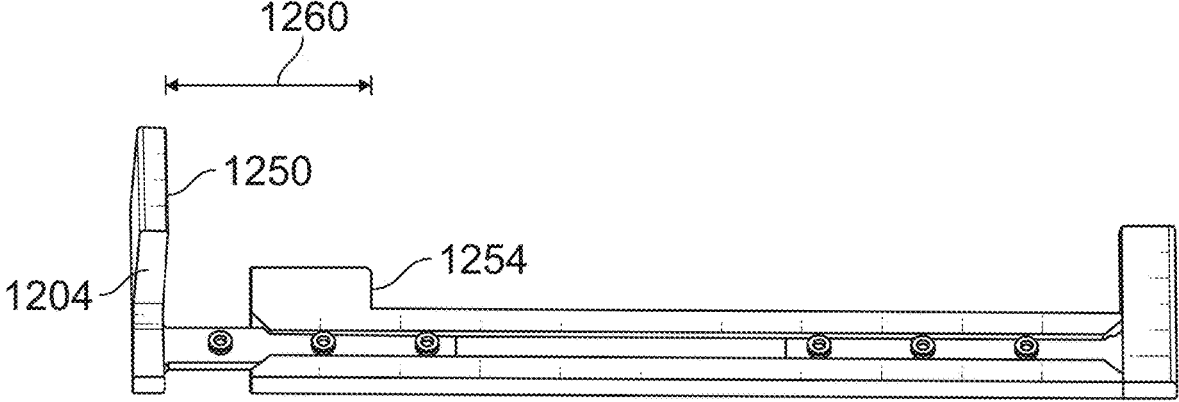

With reference to FIGS. 26C and 26D, the set screws 1230 are loosened, the tool contacting portion 1204 is shifted away from the first jig locating portion 1206, and the set screws 1230 are tightened down to lock the touch off jig 1200 in the extended position of FIG. 26D. With the tool contacting portion 1204 in the extended position, the touch off jig 1200 has a distance 1260 between the tool contacting surface 1250 of the tool contacting portion 1204 and the tool holder block contacting surface 1254 of the first jig locating portion 1206. The tool contacting portion 1204 may thereby be extended to accommodate a longer tool in the tool holder, or to position a tip of a tool farther outward from the tool holder block as desired for a particular embodiment.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims. For example, it will be appreciated that various operations of the methods disclosed herein may be combined or performed in an order different than the order discussed. As one example, operation 902 of method 900 may be performed after operations 903, 904.

What is claimed is:

1. A machine tool having a Z axis, a X axis extending perpendicular to the Z axis, and a Y axis extending perpendicular to the Z axis and the X axis, the machine tool comprising:

an artifact;

a head including a rotatable workpiece holder, the head configured to rotate the workpiece holder around the Z axis;

a probe configured to be mounted to the workpiece holder;

tool holders for holding tools in spaced apart relation to one another;

a tool holder actuator operable to move the tool holders along the X axis and the Y axis relative to the workpiece holder;

a controller operably connected to the head, the probe, and the tool holder actuator;

a memory configured to store locations of calibration surfaces of the artifact;

the controller configured to:

calibrate the probe with respect to the Z, X, and Y axes by moving the probe and the artifact relative to one another to bring the probe and the artifact into contact with one another, wherein calibrating the probe includes:

determining a Z-axis offset value and a centerline of the probe along the X and Y axes using the stored locations of the calibration surfaces of the artifact and the relative movement of the probe and the artifact; and determine a tool offset value for a tool of the tools received in the tool holders using data from calibrating the probe and by moving the probe and the tool holders relative to one another to bring the probe and the tool into contact with one another.

2. The machine tool of claim 1 wherein the artifact is connected to the tool holders and the tool holder actuator is configured to move the artifact along at least one of the X axis and the Y axis;

wherein the head is operable to shift the rotatable workpiece holder along the Z axis; and wherein the controller is configured to calibrate the probe by causing the tool holder actuator to shift the artifact along at least one of the X and Y axes and causing the head to shift the rotatable workpiece holder and the probe mounted thereto along the Z axis.

3. The machine tool of claim 1 wherein the head includes:

a workpiece holding shaft, the rotatable workpiece holder associated with the workpiece holding shaft;

a workpiece supporting shaft; and at least one drive operable to rotate the workpiece holding shaft and the workpiece supporting shaft around the Z axis, the at least one drive operable to axially shift the workpiece holding shaft and the workpiece supporting shaft relative to one another to adjust a position of the probe relative to the workpiece supporting shaft.

4. The machine tool of claim 3 wherein the controller is configured to calibrate the probe by moving the probe and the artifact relative to one another including causing the at least one drive to axially shift the workpiece holding shaft relative to the workpiece supporting shaft to contact the probe and the artifact.

5. The machine tool of claim 1 wherein the head includes a workpiece supporting shaft for rotating with the rotatable workpiece holder and a guide bushing configured to be releasably mounted to the workpiece supporting shaft and rotate therewith.

6. The machine tool of claim 1 wherein moving the probe and the artifact relative to one another includes moving at least one of the probe and the artifact a distance along the Z-axis of the head; and wherein the controller is configured to calibrate the probe including determining a Z-axis offset value of the probe based at least in part on the distance along the Z-axis and the location of the artifact stored in the memory.

7. The machine tool of claim 1 wherein the controller is configured to calibrate the probe including determining a Z-offset value of the probe relative to the Z-axis of the head, the rotatable workpiece holder rotatable around the Z-axis of the head;

wherein the probe has a leading end surface portion and the calibration surfaces of the artifact includes an end surface portion; and wherein the controller is configured to calibrate the probe including moving the probe and the artifact relative to one another to bring the leading end surface portion of the probe and the end surface portion of the artifact into contact with one another.

8. The machine tool of claim 1 wherein the calibration surfaces of the artifact include a flat end surface portion and a cylindrical outer surface;

wherein the probe includes a flat leading surface portion and a flat side surface portion; and wherein the controller is configured to calibrate the probe including moving the probe and the artifact to:

bring the flat leading surface portion of the probe and the flat end surface portion of the artifact into contact with one another; and bring the flat side surface portion of the probe and the cylindrical outer surface of the artifact into contact with one another.

9. The machine tool of claim 1 wherein one of the probe and the artifact includes a cylindrical surface and the other of the probe and the calibration surfaces of the artifact include a plurality of flat surfaces;

wherein the controller is configured to calibrate the probe by moving the probe and artifact relative to one another to bring the flat surfaces and the cylindrical surface into contact with one another and determining a centerline of the probe.

10. The machine tool of claim 1 wherein the tool includes tools include a facing tool and a plurality of other tools;

wherein the controller is configured to determine the tool offset value including a master Z-axis tool offset value associated with the facing tool and tool offset values associated with the other tools;

wherein the controller is configured to determine the master Z-axis tool offset value for the facing tool by moving the probe and the facing tool relative to one another bring the probe and the facing tool into contact with one another; and wherein the controller is configured to determine the tool offset values for the other tools by using the master Z-axis tool offset value and moving the probe and the other tools relative to one another to bring the probe and the other tools into contact with one another.

11. The machine tool of claim 1 wherein the probe includes a radio frequency transmitter, the probe configured to cause the radio frequency transmitter to transmit radio frequency signals upon the probe contacting the artifact and the tool; and a radio frequency receiver operatively connected to the controller and configured to receive the radio frequency signals.

12. The machine tool of claim 1 further comprising a tool holder block including the tool holders.

13. The machine tool of claim 1 further comprising a user interface operatively connected to the controller, the user interface configured to receive a user input; and wherein the controller is configured to autonomously calibrate the probe and determine the tool offset value upon the user interface receiving the user input.

14. The machine tool of claim 1 wherein the head includes a first head and a second head;

wherein the tool holders include a first tool holder array for machining a workpiece held by the first head and a second tool holder array for machining a workpiece held by the second head.

15. A machine tool comprising:

an artifact;

a head including a rotatable workpiece holder;

a probe configured to be mounted to the workpiece holder;

a tool holder for holding a tool;

a tool holder actuator operable to move the tool holder;

a controller operably connected to the head, the probe, and the tool holder actuator, the controller configured to:

calibrate the probe by moving the probe and the artifact relative to one another to bring the probe and the artifact into contact with one another; and determine a tool offset value for the tool using data from calibrating the probe and by moving the probe and the tool holder relative to one another to bring the probe and the tool into contact with one another;

wherein one of the probe and the artifact includes a cylindrical surface and the other of the probe and the artifact includes a plurality of flat surfaces;

wherein the controller is configured to calibrate the probe by moving the probe and artifact relative to one another to bring the flat surfaces and the cylindrical surface into contact with one another and determining a centerline of the probe;

wherein the controller is configured to calibrate the probe by moving the probe and the artifact relative to one another including:

turning the probe after bringing the flat surfaces and the cylindrical surface into contact with one another;

bringing the flat surfaces and the cylindrical surface into contact with one another after turning the probe;

wherein the controller is configured to determine a first centerline based at least in part upon moving the probe and artifact relative to one another before turning the probe;

wherein the controller is configured to determine a second centerline based at least in part upon moving the probe and artifact relative to one another after turning the probe; and wherein determining the centerline of the probe includes determining the centerline based at least in part upon the first centerline and the second centerline.

16. A method of preparing a machine tool to machine a workpiece, the machine tool having a Z axis, a X axis extending perpendicular to the Z axis, and a Y axis extending perpendicular to the Z axis and the X axis, the machine tool comprising:

a head;

an artifact in the machine tool;

a probe mounted to the head of the machine tool;

a rotatable workpiece holder of the head, the head configured to rotate the workpiece holder around the Z axis;

tool holders for holding tools in spaced apart relation to one another;

a tool holder actuator operable to move the tool holders along the X axis and the Y axis relative to the workpiece holder;

a memory configured to store locations of calibration surfaces of the artifact;

the method comprising:

determining a tool offset value for a tool of the tools received in the tool holders by moving the probe and the tool holders relative to one another to bring the probe and the tool into contact with one another; and prior to determining the tool offset value, calibrating the probe with respect to the Z, X, and Y axes by moving the probe and the artifact relative to one another to bring the probe and the artifact into contact with one another, wherein calibrating the probe includes:

determining a Z-axis offset value and a centerline of the probe along the X and Y axes using the stored locations of the calibration surfaces of the artifact and the relative movement of the probe and the artifact.

17. The method of claim 16 wherein moving the probe and artifact relative to one another includes moving at least one of the probe and the artifact a distance along the Z-axis of the head, the head operable to turn the probe around the Z-axis; and wherein calibrating the probe includes determining the Z-axis offset value of the probe based at least in part upon the distance moved along the Z-axis of the head and a position of the artifact stored in a memory associated with the machine tool.

18. The method of claim 16 wherein the calibration surfaces of the artifact include an end surface portion; and wherein moving the probe and the artifact relative to one another comprises bringing a leading end surface of the probe and the end surface portion of the artifact into contact with one another.

19. The method of claim 16 wherein the calibration surfaces of the artifact include a flat end surface portion and a cylindrical outer surface of the artifact;

wherein moving the probe and the artifact relative to one another comprises:

moving the probe and the artifact relative to one another to bring a flat leading surface portion of the probe and the flat end surface portion of the artifact into contact with one another; and moving the probe and the artifact relative to one another to bring a flat side surface portion of the probe and the cylindrical outer surface of the artifact into contact with one another.

20. The method of claim 16 wherein calibrating the probe includes determining a centerline of the probe;

wherein one of the probe and the artifact includes a cylindrical surface and the other of the probe and the artifact includes a plurality of flat surfaces;

wherein the calibration surfaces of the artifact include the cylindrical surface or the plurality of flat surfaces; and wherein moving the probe and the artifact relative to one another includes moving the probe and the artifact relative to one another to bring the flat surfaces and the cylindrical surface into contact with one another.

21. The method of claim 20 wherein moving the probe and the artifact relative to one another includes:

turning the probe after contacting each of the flat surfaces and the cylindrical surface; and moving the probe and the artifact relative to one another to bring the flat surfaces and the cylindrical surface into contact with one another after turning the probe;

wherein determining the centerline of the probe includes:

determining a first centerline based at least in part upon moving the probe and artifact relative to one another before turning the probe; and determining a second centerline based at least in part upon moving the probe and artifact relative to one another after turning the probe; and determining the centerline of the probe based at least in part upon the first centerline and the second centerline.

22. The method of claim 16 wherein moving the probe and the artifact relative to one another comprises:

shifting the artifact along at least one of the X-axis and the Y-axis to align a portion of the artifact with the probe, the X-axis perpendicular to the Y-axis; and shifting the probe along the Z-axis into contact with the portion of the artifact.

23. The method of claim 16 wherein the tools include a facing tool and a plurality of other tools;

wherein determining the tool offset value comprises:

determining a master Z-axis tool offset value relative to the Z-axis of the head by moving the probe and the facing tool relative to one another to bring the probe and the facing tool into contact with one another, the head operable to rotate the probe around the Z-axis; and determining tool offset values for the other tools by using the master Z-axis tool offset value and moving the probe and the other tools relative to another to bring the probe and the other tools into contact with one another.

24. The method of claim 16 further comprising:

shifting a workpiece holder of the head to an extended position to facilitate mounting of the probe to the workpiece holder;

shifting the workpiece holder from the extended position to a retracted position to shift a portion of the probe into a bore of the head and position a tip of the probe outside of the bore of the head; and wherein moving the probe and the artifact relative to one another to bring the probe and the artifact into contact with one another includes moving the probe and the artifact relative to one another while the portion of the probe is in the bore of the head.

25. The method of claim 16 wherein calibrating the probe includes the probe transmitting a first radio frequency signal upon contact between the probe and the artifact; and wherein determining the tool offset value includes the probe transmitting a second radio frequency signal upon contact between the probe and the tool.

26. The method of claim 16 wherein the head includes a first head and a second head;

wherein the tools include a first tool and a second tool;

wherein the probe includes a first probe mounted to the first head and a second probe mounted to the second head;

wherein calibrating the probe includes:

calibrating the first probe by moving the first probe and the artifact relative to one another to bring the first probe and the artifact into contact with one another; and calibrating the second probe by moving the second probe and the artifact relative to one another to bring the second probe and the artifact into contact with one another; and wherein determining the tool offset value for the tool includes:

determining a first tool offset value for the first tool by moving the first probe relative to the first tool to bring the first probe and the first tool into contact with one another; and determining a second tool offset value for the second tool by moving the second probe relative to the second tool to bring the second probe and the second tool into contact with one another.

27. A machine tool comprising:

a calibration member;

a head including a rotatable workpiece holder, the head including a drive operable to rotate the workpiece holder around a Z axis;

a probe of the head;

a tool holders for holding tools in spaced apart relation to one another;

a tool holder actuator operable to move the tool holders along an X axis perpendicular to the Z axis and a Y axis perpendicular to the Z and X axes;

wherein the tool holders are configured against movement along the Z axis;

a controller operably connected to the head and the tool holder actuator;

a memory of the controller operable to store location data of surface portions of the calibration member;

the controller configured to calibrate the probe by utilizing the location data of the surface portions of the calibration member and moving the probe and the calibration member relative to one another to bring the probe and the calibration member into contact with one another; and the controller configured to determine a tool offset value for a tool of the tools held in the tool holders using data from calibrating the probe and by moving the probe and the tool holders relative to one another to bring the probe and the tool into contact with one another.

28. The machine tool of claim 27 further comprising a second head;

wherein the probe is shiftable along an axis relative to the second head; and wherein the controller is configured to calibrate the probe by moving the probe and the calibration member relative to one another including moving the probe and the calibration member relative to one another along the axis.

29. The machine tool of claim 27 further comprising a machining area and a second head across the machining area from the head; and wherein the head has a probe protecting configuration wherein the head covers at least a portion of the probe and a probe exposing configuration wherein the at least a portion of the probe is uncovered by the head and is accessible via the machining area.

30. The machine tool of claim 27 wherein the controller is configured to calibrate the probe including determining a Z-axis offset value and a centerline of the probe relative to the Z-axis.

31. The machine tool of claim 27 wherein the calibration member and probe have end surfaces and side surfaces; and wherein the controller is configured to calibrate the probe by moving the probe and calibration member relative to one another to bring the side surfaces of the calibration member and the probe into contact with one another and determine a centerline of the probe.

32. The machine tool of claim 27 wherein moving the probe and the calibration member relative to one another includes moving at least one of the probe and the calibration member a distance along the Z-axis of the head; and wherein the controller is configured to calibrate the probe including determining a Z-axis offset value of the probe based at least in part on the distance along the Z-axis and the location data of the calibration member stored in the memory.

33. The machine tool of claim 27 wherein the controller is configured to calibrate the probe including determining a Z-offset value of the probe relative to the Z-axis of the head, the rotatable workpiece holder rotatable around the Z-axis of the head;

wherein the probe has a leading end surface portion and the calibration member has an end surface portion; and wherein the controller is configured to calibrate the probe including moving the probe and the calibration member relative to one another to bring the leading end surface portion of the probe and the end surface portion of the calibration member into contact with one another.

34. The machine tool of claim 27 wherein the calibration member includes an end surface portion and an outer surface;

wherein the probe includes a leading surface portion and a side surface portion; and wherein the controller is configured to calibrate the probe including moving the probe and the calibration member to:

bring the leading surface portion of the probe and the end surface portion of the calibration member into contact with one another; and bring the side surface portion of the probe and the outer surface of the calibration member into contact with one another.

35. The machine tool of claim 27 wherein one of the probe and the calibration member includes a cylindrical surface and the other of the probe and the calibration member includes a plurality of flat surfaces;

wherein the controller is configured to calibrate the probe by moving the probe and calibration member relative to one another to bring the flat surfaces and the cylindrical surface into contact with one another and determining a centerline of the probe.

36. The machine tool of claim 27 wherein the tools include a facing tool and a plurality of other tools;

wherein the controller is configured to determine the tool offset value including a master Z-axis tool offset value associated with the facing tool and tool offset values associated with the other tools;

wherein the controller is configured to determine the master Z-axis tool offset value for the facing tool by moving the probe and the facing tool relative to one another bring the probe and the facing tool into contact with one another; and wherein the controller is configured to determine the tool offset values for the other tools by using the master Z-axis tool offset value and moving the probe and the other tools relative to one another to bring the probe and the other tools into contact with one another.

37. The machine tool of claim 27 further comprising a tool holder block including the tool holders.

38. The machine tool of claim 27 further comprising a user interface operatively connected to the controller, the user interface configured to receive a user input; and wherein the controller is configured to autonomously calibrate the probe and determine the tool offset value upon the user interface receiving the user input.

* * * * *